(12) United States Patent
Jin et al.

(10) Patent No.: US 10,565,518 B2
(45) Date of Patent: Feb. 18, 2020

(54) COLLABORATIVE FEATURE LEARNING FROM SOCIAL MEDIA

(71) Applicant: Adobe Inc., San Jose, CA (US)

(72) Inventors: Hailin Jin, San Jose, CA (US); Chen Fang, Hanover, NH (US); Jianchao Yang, San Jose, CA (US); Zhe Lin, Fremont, CA (US)

(73) Assignee: Adobe Inc., San Jose, CA (US)

( * ) Notice: Subject to any disclaimer, the term of this patent is extended or adjusted under 35 U.S.C. 154(b) by 838 days.

(21) Appl. No.: 14/748,059

(22) Filed: Jun. 23, 2015

(65) Prior Publication Data

US 2016/0379132 A1 Dec. 29, 2016

(51) Int. Cl.
*G06N 20/00* (2019.01)
*G06N 3/02* (2006.01)
*H04L 29/08* (2006.01)

(52) U.S. Cl.
CPC ............ *G06N 20/00* (2019.01); *H04L 67/02* (2013.01); *H04L 67/22* (2013.01); *G06N 3/02* (2013.01)

(58) Field of Classification Search
CPC .......... G06N 99/005; G06N 5/02; G06N 5/04; G06N 20/00; G06N 3/02
See application file for complete search history.

(56) References Cited

U.S. PATENT DOCUMENTS

2013/0091081 A1* 4/2013 He ...................... G06N 99/005
706/12
2013/0097246 A1* 4/2013 Zifroni ................ G06O 50/01
709/204

OTHER PUBLICATIONS

Yuan, Zhaoquan, et al. "Latent feature learning in social media network." Proceedings of the 21st ACM international conference on Multimedia. ACM, 2013.*
Coates, Adam, Andrew Ng, and Honglak Lee. "An analysis of single-layer networks in unsupervised feature learning." Proceedings of the fourteenth international conference on artificial intelligence and statistics. 2011.*
Koren, Yehuda, Robert Bell, and Chris Volinsky. "Matrix factorization techniques for recommender systems." Computer42.8 (2009).*
Lee, Dong-Hyun. "Pseudo-label: The simple and efficient semi-supervised learning method for deep neural networks." Workshop on Challenges in Representation Learning, ICML. vol. 3. 2013.*
Dror, Gideon, et al. "The yahoo! music dataset and kdd-cup'11." Proceedings of the 2011 International Conference on KDD Cup 2011—vol. 18. JMLR. org, 2011.*

(Continued)

*Primary Examiner* — Eric Nilsson
(74) *Attorney, Agent, or Firm* — Keller Jolley Preece

(57) ABSTRACT

The present disclosure is directed to collaborative feature learning using social media data. For example, a machine learning system may identify social media data that includes user behavioral data, which indicates user interactions with content item. Using the identified social user behavioral data, the machine learning system may determine latent representations from the content items. In some embodiments, the machine learning system may train a machine-learning model based on the latent representations. Further, the machine learning system may extract features of the content item from the trained machine-learning model.

20 Claims, 9 Drawing Sheets

(56) References Cited

OTHER PUBLICATIONS

Hu, Yifan, Yehuda Koren, and Chris Volinsky. "Collaborative filtering for implicit feedback datasets." Data Mining, 2008. ICDM'08. Eighth IEEE International Conference on. Ieee, 2008.*

Wang, Hao, Naiyan Wang, and Dit-Yan Yeung. "Collaborative Deep Learning for Recommender Systems." arXiv preprint arXiv: 1409.2944 (2014). (Year: 2014).*

A. Bergamo and L. Torresani. Meta-class features for largescale object categorization on a budget. In Computer Vision and Pattern Recognition (CVPR), 2012.

D. Dai and L. V. Gool. Ensemble projectoin for semisupervised image classification. In ICCV, 2013.

G. Dror, N. Koenigstein, Y. Koren, and M. Weimer. The yahoo! music dataset and kdd-cup '11. In Proceedings of KDD Cup 2011 competition, San Diego, CA, USA, 2011, pp. 8-18, 2012.

A. Farhadi, I. Endres, D. Hoiem, and D. Forsyth. Describing objects by their attributes. In Computer Vision and Pattern Recognition (CVPR), 2009.

Goldberg, Roeber, Gupta, and Perkins. Eigentaste: A constant time collaborative filtering algorithm. Information Retrieval, 4(2), 2011.

G. Griffin, A. Holub, and P. Perona. Caltech-256 object category dataset. 2007.

Y. Hu, Y. Koren, and C. Volinsky. Collaborative filtering for implicit feedback datasets. In International Conference on Data Mining (ICDM), 2008.

S. Karayev, A. Hertzmann, H. Winnemoeller, A. Agarwala, and T. Darrell. Recognizing image style. arXiv preprint arXiv:1311.3715, 2013.

A. Krizhevsky, I. Sutskever, and G. E. Hinton. Imagenet classification with deep convolutional neural networks. In Neural Information Processing Systems (NIPS), 2012.

S. Lazebnik, C. Schmid, and J. Ponce. Beyond bags of features: Spatial pyramid matching for recognizing natural scene categories. In Computer Vision and Pattern Recognition (CVPR), 2006.

H. Lee, R. Grosse, R. Ranganath, , and A. Y. Ng. Convolutional deep belief networks for scalable unsupervised learning of hierarchical representations. In Proceedings of the 26th International Conference on Machine Learning (ICML), 2009.

L. Li, H. Su, Y. Lim, and F. Li. Object bank: An object-level image representation for high-level visual recognition. International Journal of Computer Vision (IJCV), 107(1):20-39, 2014.

D. G. Lowe. Object recognition from local scale-invariant features. In international conference on Computer vision (ICCV), 1999.

A. Oliva and A. Torralba. Building the gist of a scene: The role of global image features in recognition. Progress in brain research, 155:23-36, 2006.

A. Quattoni, M. Collins, and T. Darrell. Transfer learning for image classification with sparse prototype representations. In CVPR, 2008.

R. Raina, A. Battle, H. Lee, B. Packer, and A. Y. Ng. Selftaught learning: Transfer learning from unlabeled data. In International Conference on Machine Learning (ICML), 2007.

M. Ranzato, F. J. Huang, Y. Boureau, and Y. LeCun. Unsupervised learning of invariant feature hierarchies with applications to object recognition. In Computer Vision and Pattern Recognition (CVPR), 2007.

S. Singh, A. Gupta, and A. A. Efros. Unsupervised discovery of mid-level discriminative patches. In European Conference on Computer Vision (ECCV), 2012.

Torresani, Szummer, and Fitzgibbon. Efficient object category recognition using classemes. In ECCV, 2010.

A. Van den Oord, S. Dieleman, and B. Schrauwen. Deep content-based music recommendation. In Neural Information Processing Systems (NIPS), 2013.

Z. Yuan, J. Sang, C. Xu, and Y. Liu. A unified framework of latent feature learning in social media. Multimedia, IEEE Transactions on, 2014.

* cited by examiner

COLLABORATIVE FEATURE LEARNING FROM SOCIAL MEDIA

BACKGROUND

1. Technical Field

One or more embodiments of the present disclosure relate generally to machine learning. More specifically, one or more embodiments of the present disclosure relate to systems and methods for training and applying machine learning to learn features of content items such as images.

2. Background and Relevant Art

Image recognition is a central problem in the field of computer vision (e.g., the field of computers acquiring, processing, analyzing, and understanding images in order to produce numerical or symbolic information). One area of computer vision that has shown great progress in the last decade is feature learning. Feature learning plays a role in image recognition by combining computer vision and machine learning to solve visual tasks. In particular, feature learning finds a set of representative features by collecting features from images and learning the features using machine-learning techniques.

Early image recognition systems typically use hand-crafted image features. These early image recognition systems focus on spatial pyramid matching techniques that recognize natural scenery, objects from local scale-invariant features, and object categories using the output of a set of predefined category-specific classifiers. As such, these early image recognition systems typically require users to manually identify features in order to train the system to learn and recognize image features. Because these early image recognition systems typically concentrate on low-level features (e.g., the appearance of images), these early systems often require a significant amount of domain knowledge. As a result, these early image recognition systems often do not generalize well to new domains.

More recent image recognition systems shift their focus toward high-level features. In other words, more recent image recognition systems concentrate more on semantics rather than on appearance. These recent image recognition systems, however, still suffer from a number of shortcomings, which has led to the development of current image recognition systems.

Current image recognition systems attempt to learn features directly from data (e.g., images). In particular, current image recognition systems often use supervised training from user-labeled data to perform image recognition. Using data-driven features, current systems appear to effectively outperform the early and recent image recognition systems in some cases. Current image recognition systems do not typically require domain knowledge. This being said, current image recognition systems often do require large-scale category labels (in the order of millions) to properly train the system. Accordingly, current image recognition systems are often limited in domains where labels are difficult to obtain.

As another problem, in domains where labels are difficult to obtain, users typically are required to manually provide domain labels before current image recognition systems can perform image recognition. In some instances, current image recognition systems try to get around the problem of training in a new domain without labels by using labels from related domains. Using labels transferred from other domains, however, typically results in poor image recognition outcomes.

These and other problems exist with regard to image recognition and feature learning in the field of computer vision.

BRIEF SUMMARY

Embodiments of the present disclosure provide benefits and/or solve one or more of the foregoing or other problems in the art with systems and methods for learning features based on data from social media. In particular, the systems and methods learn features of content items from data from social media that indicates user interaction with the content items. The use of social media data allows the systems and methods to learn features of the content items without requiring large-scale category labels. Upon learning features of the content items, the system and methods can use the learned features of the content items in various machine-learning applications.

More particularly, in one or more embodiments, the systems and methods identify latent representations of the content items from the social media data. The identified latent representations can encode information about the similarity of content items. Using the identified latent representations, the systems and methods learn features of the content items. For example, the systems and methods can generate pseudo classes by clustering the latent representations. The systems and methods then train a machine-learning model using the pseudo classes. The trained machine-learning model can then allow for a variety of machine learning applications, such as similar item identification and recommendations.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of this disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore considered to be limiting in scope, various embodiments will be described and explained with additional specificity and detail through the use of the accompanying drawings in which.

DETAILED DESCRIPTION

Figure 1:
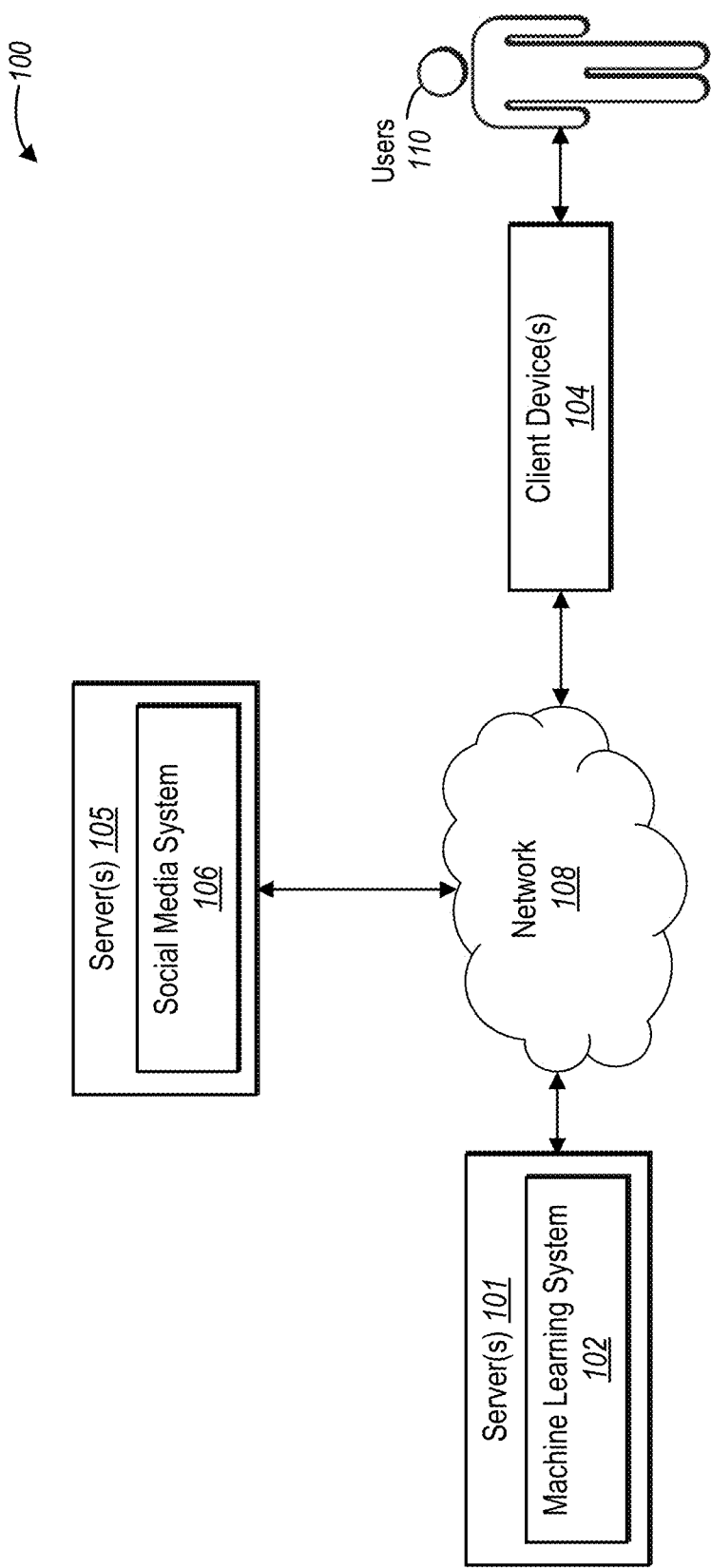
FIG. 1 illustrates a schematic diagram of an exemplary environment in which a machine learning system can operate in accordance with one or more embodiments.

One or more embodiments of the present disclosure include a machine learning system that learns features of content items using social media data. In particular, in one or more embodiments, the machine learning system identifies user behavioral data from a social media system in relation to content items. The machine learning system then identifies latent representations of the content items from the user behavioral data. Based on the latent representations determined from the content items, the machine learning system learns features of the content items. Once the machine learning system learns the features of the content items, the machine learning system can perform a variety of machine learning applications.

More specifically, in one or more embodiments, the machine learning system identifies latent representations of the content items from the social media data. The identified latent representations can encode information about the similarity of content items. Using the identified latent representations, the machine learning system learns features of the content items. For example, the machine learning system can generate pseudo classes by clustering the latent representations. The machine learning system then trains a machine-learning model using the pseudo classes. The trained machine-learning model can then allow for a variety of machine learning applications, such as similar item identification and recommendations. Accordingly, the machine learning system can effectively learn features of content items without user-generated labels or otherwise supervised data.

To illustrate, in one example implementation, a social media system hosts or otherwise provides access to a variety of content items (images, photographs, videos, etc.). Users of the social media system can access the content items hosted by the social media system. In some cases, users may indicate appreciation for one or more of the content items and/or leave a comment or feedback. As a user accesses one or more content items hosted by the social media system, the social media system takes note of each content item viewed by each user. The social media system then provides the information of which users viewed which content items to the machine learning system as social media data.

The machine learning system may use the social media data to identify representations for both the users and the content items. For instance, the machine learning system may use the social media data to learn features corresponding to the various content items hosted by the social media system. Using the learned features, the machine learning system may train a machine-learning model. The social media system can then use the trained machine-learning model for various machine-learning applications. For example, a user may provide an image to the machine learning system and the machine learning system may classify the image, present similar images (e.g., similar works from the website) to the user, or recommend one or more additional images to the user in which the user have interest. In some example embodiments, the machine learning system may present the user with co-users who have interests in images similar to the image provided by the user.

As mentioned above, the machine learning system uses social media data in feature learning. In some cases, however, the social media data may be sparse. Thus, while the social media data may include a large amount of behavior data between users and content items, the social media data set may have missing entries when comparing all users to all content items. To illustrate, in the case that the social media data represents which users viewed which content items, unless every user views every content item, the social media data set will have missing entries where a particular user did not view a particular content item. As is often the case in larger data sets, the majority of entries in the social media data set may be missing. As such, in some example embodiments, the machine learning system populates some of the missing entries to improve the data set. For example and as described below, the machine learning system may probabilistically populate a number of missing entries to help complete the social media data.

Similarly, in one or more embodiments, the machine learning system may normalize the social media data. For instance, the machine learning system may exclude outliers in the social media data. To illustrate, in the case that the social media data represents which users viewed which content items, the machine learning system may exclude content items that do not have enough views or that have too many views. Further, the machine learning system may remove users that have viewed too many or too few content items. By normalizing the social media data, the machine learning system increases the quality of machine learning, and thus, improves the functionality and accuracy of the machine learning system.

In some example embodiments, the machine learning system uses clustering to learn content item features. In particular, the machine learning system divides the latent representations of the content items into user latent factors and content item latent factors. The machine learning system clusters the latent factors for the content items into a group of clusters. When the latent factors for the content items are clustered into groups, the machine learning system learns the features of the content items by training a machine-learning model with the cluster groups. Additional detail regarding how the machine learning system trains a machine-learning model and learns content item features is described below.

As mentioned above, the machine learning system uses social media data to mitigate the dataset scalability issue in feature learning from which many conventional (e.g., early, more recent, and current) image recognition systems suffer. Additionally, the machine learning system may perform machine learning without relying on user-generated labels. Further, regardless of if the social media data is strong data, such as labels assigned by users, or weak data, such as implicit user behavior data, the machine learning system may produce results that are superior to conventional image recognition systems. Moreover, once a machine-learning model is trained, the machine-learning system can use machine learning for a variety of machine learning applications, such as content item identification and for providing recommendations.

As used herein, the term "content item" refers generally to any data or information a computing device can present to a user. To illustrate, examples of a content item can include one or more digital images, digital media, audio/music files, electronic documents, advertisements, multimedia presentations, etc. Groups of content items can include a plurality of content items. For example, an image gallery can include various digital images. A group of content items can include the same or similar content items or random or unrelated content items. For instance, a group of content items can include a plurality of several different types of content items. For purposes of describing one or more embodiments disclosed herein, reference is often made to content items representing digital images. One will appreciate, however, that content items include any of the example content items listed above, such as videos, songs, or audio clips.

As used herein, the term "social media data" refers to data maintained by a social media system (e.g., FACEBOOK, TWITTER, BEHANCE). Social media data can indicate the behavior of one or more users of the social media system. In other words, the social media data can include user behavioral data. In particular, social media data may include user behavioral data that indicates interactions between users and content items. Social media data may be implicit or explicit. Implicit social media data may provide an indirect reflection of a user's opinion of a content item. For example, when a user views a content item, the user may signal an interest in, or a preference for the content item. As another example, when a user devotes less than a threshold amount of time to a content item, the user may be signaling disinterest in or dissatisfaction for the content item.

Explicit social media data may include when a user actively provides an opinion of a content item. Examples of explicit social media data include when a user appreciates, likes, ranks, votes for, votes against, rates, comments on, or otherwise provides positive or negative feedback on a content item. Another example of explicit social media data may include ownership of a content item by a user. In some cases, social media data may include multiple indications of user behavior. For example, social media data may include both implicit social media data as well as explicit social media data.

The term "machine learning," as used herein, refers to the process of constructing and implementing algorithms that can learn from and make predictions on data. In general, machine learning may operate by building models from example inputs (e.g., training), such as social media data, in order to make data-driven predictions or decisions. In some example embodiments, machine learning is used for data mining, and statistical pattern recognition, such as collaborative feature learning, or learning features from social media data.

The term "latent representations" or "latent factors" may refer to representations or features that are not directly measurable. Thus, "latent representations" or "latent factors" can comprise representations or factors that are inferred through modeling by using other features. Similarly, the terms "latent representations" may refer to representations that are generated by modeling indirect data through feature learning.

Feature learning can comprise two categories: supervised feature learning and unsupervised feature learning. In supervised feature learning, features are learned based on labeled input data. Examples include neural networks, multilayer perceptron, and (supervised) dictionary learning. In unsupervised feature learning, features are learned with unlabeled input data. Examples include dictionary learning, independent component analysis, matrix factorization, and various forms of clustering.

FIG. 1 illustrates a schematic diagram of one embodiment of an exemplary environment 100 in which a machine learning system 102 can operate. In one or more embodiments, the exemplary environment 100 includes the machine learning system 102 hosted on one or more servers 101. The exemplary environment 100 also includes client device(s) 104, connected to a social media system 106 hosted on one or more servers 105 via a network 108. Although the environment 100 of FIG. 1 is depicted as having various components, the environment 100 may have any number of additional or alternative components. For example, the environment 100 can include other components not shown in FIG. 1. Further, while FIG. 1 illustrates a particular arrangement of the machine learning system 102, client device(s) 104, social media system 106, and the network 108, various additional arrangements are possible. For instance, the machine learning system 102 may directly communicate with the social media system 106, bypassing the network 108. Furthermore, while FIG. 1 illustrates the social media system 106 and the machine learning system 102 as separate components on different servers, in one or more embodiments the social media system 106 and the machine learning system 102 can be part of a single system hosted on one or more servers.

As mentioned, the machine learning system 102, the client device 104, and the social media system 106 communicate via the network 108, which may include one or more networks and may use one or more communications platforms or technologies suitable for transmitting data and/or communication signals. Additional details relating to the network 108 are explained below with reference to FIG. 9.

As illustrated in FIG. 1, a user 110 interfaces with the client device 104, for example, to access the social media system 106. The user 110 may be an individual (i.e., human user), a business, a group, or other entity. Although FIG. 1 illustrates only one user 110, it is understood that the environment 100 can include a plurality of users, with each of the plurality of users can interact with the social media system with a corresponding client device 104.

The client device 104 represents various types of client devices. For example, the client device 104 may be a mobile device (e.g., a mobile telephone, a smartphone, a PDA, a tablet, a laptop, a camera, a tracker, a watch, a wearable device, etc.). The client device 104, however, in some embodiments, may be a non-mobile device (e.g., a desktop computer or another type of client device). Additional details with respect to the client device 104 are discussed below with respect to FIG. 9.

The social media system 106 maintains a collection of content items, such as images, audio segments, videos, etc., with which users can view or otherwise interact. The social media system 106 allows users to add, edit, remove, or otherwise modify content items maintained by the social media system 106. Additionally or alternatively, the social media system 106 enables users to appreciate, comment on, like, rate, disapprove, and/or share the content items maintained by the social media system 106 or the client devices 104. In some example embodiments, the social media system 106 stores the content items outside of the social media system 106 while still facilitating users access to the content items via the social media system 106.

As briefly mentioned above, the user 110 uses the client device 104 to access the social media system 106. For instance, in some cases, the user 100, via the client device 104, accesses content items on the social media system 106. As users interact with content items via the social media system 106, the social media system 106 collects social media data for the content items. In particular, the social media system 106 stores the behaviors of users as social media data as the users interact with the content items. To illustrate, when a user views or appreciates a particular content item, the social media system 106 may track the user interaction.

As illustrated in FIG. 1, the social media system 106 communicates with the machine learning system 102 via the network 108. For instance, the social media system 106 may send the social media data to the machine learning system 102. Using the social media data, the machine learning system 102 identifies latent representations from user behavior and the content items. Further, the machine learning system 102 may further use the social media data to learn features of the content items.

In some example embodiments, once the machine learning system 102 learns features of the content items, the machine learning system 102 uses the learned features to identify and recommend additional content items to a user. To illustrate, a user may select a content item to view on the social media system 106. In response, the social media system 106 may notify the machine learning system 102 of the selected content item, and in turn, the machine learning system 106 may identify additional content items for the social media system 106 to present to the user that are similar to the content item selected by the user. As another example, if a user appreciates a content item, the machine learning system 102 can identify and recommend additional content items that the user may also appreciate. Similarly, based on a user's appreciation for one or more content items, the machine learning system 102 may identify other users that appreciate similar content items as the user.

Figure 2:
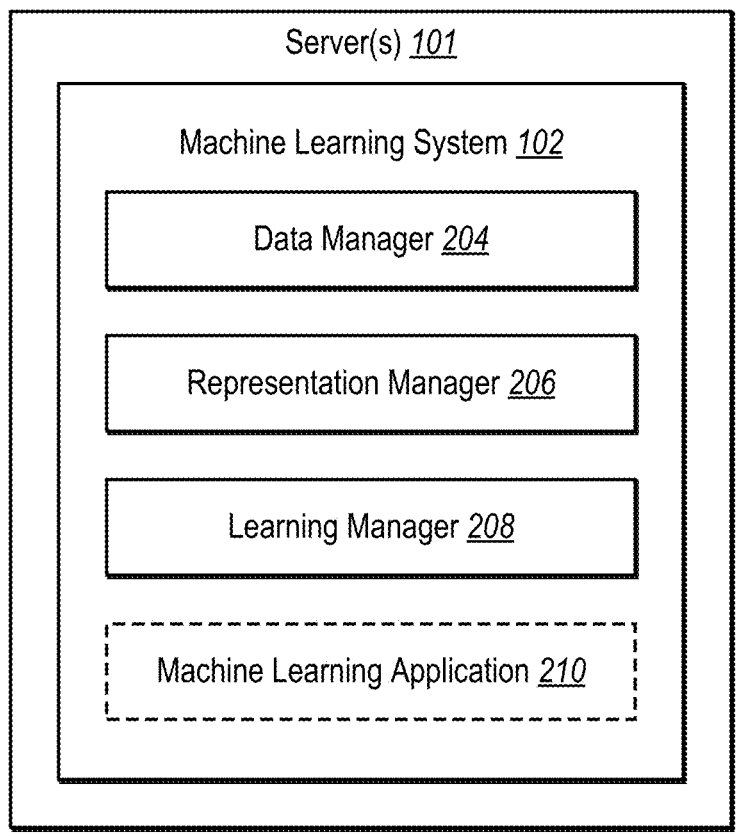
FIG. 2 illustrates an example schematic diagram of the machine learning system of FIG. 1 in accordance with one or more embodiments.

FIG. 2 illustrates a schematic diagram illustrating an example embodiment of the machine learning system 102 illustrated in the environment of FIG. 1. As shown, the machine learning system 102 can include various components for performing the processes and features described herein. For example, as shown in FIG. 2, the machine learning system includes, but is not limited to, a data manager 204, a representation manager 206, and a learning manager 208. In some example embodiments, the machine learning system 102 may optionally include a machine learning application 210. Although the disclosure herein describes the components 204-210 as separate components, as illustrated in FIG. 2, any of the components 204-210 may be combined into fewer components, such as into a single facility or module, or divided into more components as may serve one or more embodiments.

The components 204-210 can comprise software, hardware, or both. For example, the components 204-210 can comprise one or more instructions stored on a computer-readable storage medium and executable by processors of one or more computing devices, such as a client device or server device. When executed by the one or more processors, the computer-executable instructions of the machine learning system 102 can cause the computing device(s) to perform the feature learning methods described herein. Alternatively, the components 204-210 can comprise hardware, such as a special purpose processing device to perform a certain function or group of functions. Additionally or alternatively, the components 204-210 can comprise a combination of computer-executable instructions and hardware.

As mentioned above and as shown in FIG. 2, the machine learning system 102 includes a data manager 204. The data manager 204 obtains social media data, which can include user behavioral data corresponding to content items, from a social media system. At times the social media data the machine learning system 102 obtains from the social media system is noisy. While the social media data may be noisy at times, the machine learning system may still be able to accurately reflect the semantic representation between the images by applying machine learning techniques described herein. Additionally or alternatively to obtaining the social media data from a social media system, the data manager 204 may receive social media data from other sources or may directly collect the social media data by observing the behaviors of users in relation to content items.

In some example embodiments, the data manager 204 organizes and normalizes the social media data received from the social media system. For example, the data manager 204 may populate missing portions of the social media data to improve the machine learning process. As another example, the data manager 204 may filter or remove data from the social media data, such as outlier data. Further, in some instances, the data manager 204 can divide the social media data into multiple datasets.

As shown in FIG. 2, the machine learning system 102 includes the representation manager 206. The representation manager 206 may use the social media data to determine latent representations from the content items. More specifically, the representation manager 206 may use the user behavioral data to recover hidden or latent representations of individual content items and learn features from the content items based on the recovered latent representations.

As mentioned above, when a user interacts with multiple content items, there is an increased likelihood that the multiple content items share similar features and styles to each other. As such, the representation manager 206 may use the social media data to determine which content items are related to each other, and as a result which content items will likely have common features and styles. Further, in some example embodiments, the representations that representation manager 206 determines are latent representations. In many cases, representations from content items are not explicit, and as such, the representation manager 206 needs to determine whether a latent representation exists between the content items.

In determining representations from content items, such as latent representations, the representation manager 206 may apply collaborative filtering to the social media data. As one example, the representation manager 206 may use collaborative filtering to produce various types of representations, such as content item representations and user representations. Additional detail with respect to producing representations from the social media data is described below.

Once the representation manager 206 determines representations from the social media data, such latent representations, the representation manager 206 may group the latent representations into various clusters. In particular, in some example embodiments, the representation manager 206 may group the latent representations for content items into groups of clusters. For instance, the representation manager 206 may use k-means clustering, as described below, to group the content item latent representations into clusters. Additionally or alternatively, the representation manager 206 may also group the user latent representations into clusters.

After the latent representations are grouped into clusters, the representation manager 206 creates pseudo classes based on the various clusters. In particular, the representation manager 206 creates pseudo classes for the content items based on the clusters corresponding to the content item latent representations. In some instances, creating discrete pseudo classes creates a data set that is more robust to outliers when performing machine learning.

As shown in FIG. 2, the machine learning system 102 includes the learning manager 208. In general, the learning manager 208 learns features of the social media data based on the latent representations. Additionally, the learning manager 208 trains a machine-learning model using the latent representations. Further, the learning manager 208 may refine the machine-learning model through training and testing.

As mentioned above, in one or more embodiments, the learning manager 208 learns features of the social media data based on the latent representations. For example, the learning manager 208 learns content item features based on the latent representations determined from the content items. The learning manager 208 uses the latent representations to train because the latent representations largely reflect the sematic representation between content items. In particular, the latent representations provide the ability to identify rich high-level visual and sematic information of corresponding content items. As such, the learning manager 208 can use the latent representations as a source of supervision for learning meaningful features for the content items from the social media system.

Further, the learning manager 208 may train a machine-learning model using the latent representations and extract features from the trained machine-learning model. As a machine-learning model is trained, the machine-learning model begins to understand how to correctly classify objects. Accordingly, by training the machine-learning model with latent representations of the content items, the machine-learning model may be used to correctly classify content items. As an example, the learning manager 208 uses the pseudo classes to train a machine-learning model, and more specifically, the learning manager 208 uses the pseudo classes, which were formed from the clusters of content items, to train a machine-learning model to recognize content item features (e.g., learned latent representations).

As shown in FIG. 2, the machine learning system 102 may optionally include a machine learning application 210. The machine learning application 210 can use the trained machine-learning model to reveal properties of the content items. In other words, once the learning manager 208 trains the machine learning system 102 to recognize content item features (e.g., learned features), the machine learning application 210 can use the learned features to identify, classify, and provide recommendations of content items.

To illustrate, suppose the content items include a group of audio clips. A user may provide a song to the machine learning system 102, and the machine learning application 210 can recommend similar songs based on learned features identified in the query song as well as the resulting songs. As another example, if the content items are images, the machine learning application 210 may classify an image a user provides to the machine learning system 102 and present the classification to the user. As yet another example, based on the machine learning system 102 receiving one content item, the machine learning application 210 can identify a number of content items having similar features and styles.

One will appreciate in light of the disclosure herein that once features are learned using social media data, the machine learning application 210 can use the learned features to identify, classify, and/or provide recommendations of content items from the social media data or other sources. For example, the machine learning application 210 can learn features from social media data then use the learned features to perform one or more machine learning applications on a set of data or content items that are not part of the social media data. Alternatively, the machine learning application 210 can learn features from social media data then use the learned features to perform one or more machine learning applications on the social media data.

As discussed above, the machine learning system 102 can use social media data to learn features about content items. In order to learn features, in one or more embodiments, the machine learning system 102 uses latent factor analysis. For example, the machine learning system 102 can construct a user behavioral matrix based on social media data indicating user behavior in relation to content items.

Figure 3:
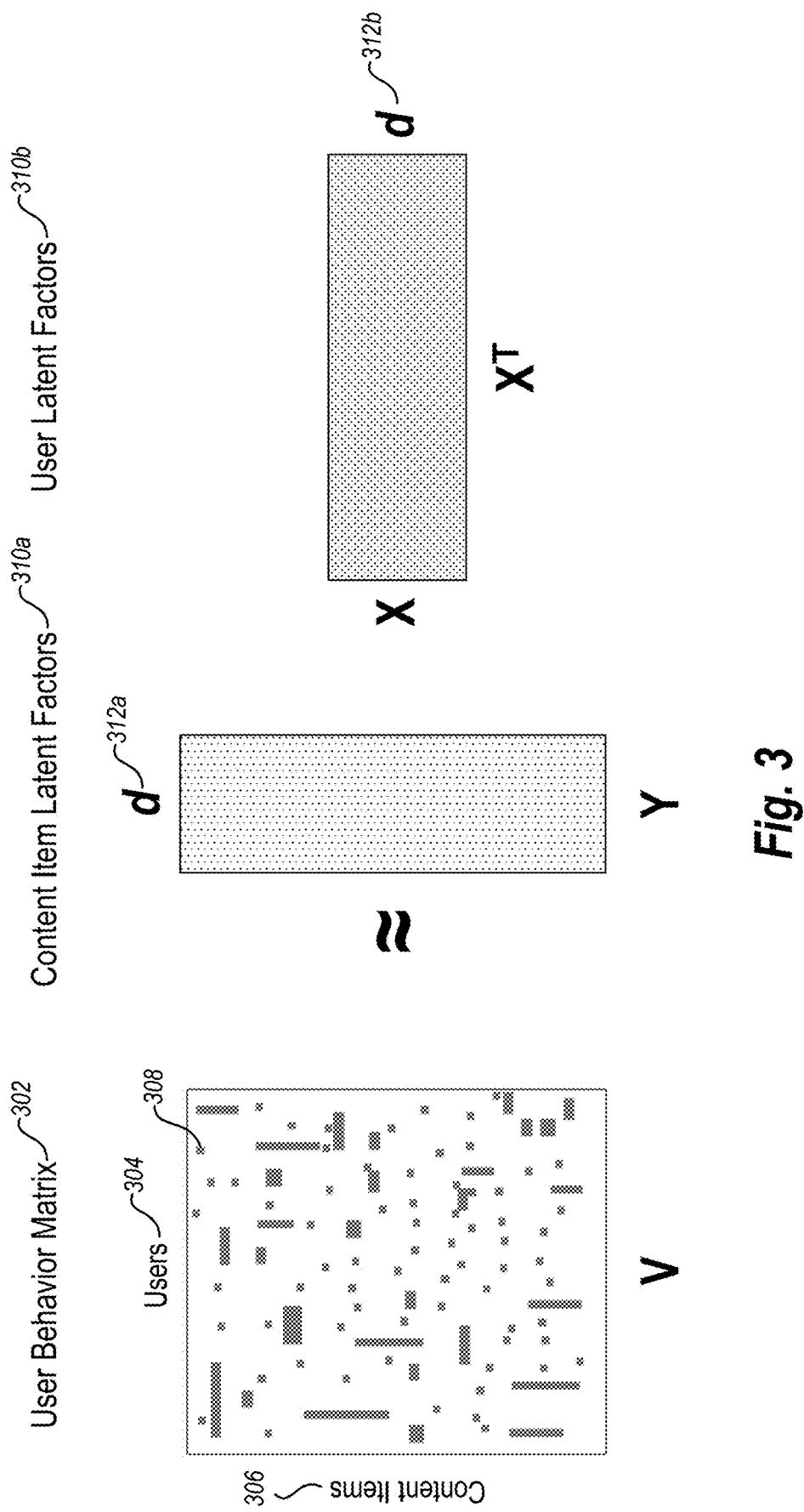
FIG. 3 illustrates a user behavioral matrix in accordance with one or more embodiments.

FIG. 3 illustrates one example of a user behavioral matrix 302. The machine learning system 102 generates the user behavioral matrix 302 using the social media data received from the social media system. Alternatively, the machine learning system may receive the user behavioral matrix 302 from a social media system or from another source that captures user behavioral data and provides the user behavioral data to the machine learning system as social media data. As shown in FIG. 3 the user behavioral matrix 302 may be represented as V.

The columns in the user behavioral matrix 302 represent users 304 and the rows 306 represent content items. As shown in FIG. 3, each shaded squares in the user behavioral matrix 302 represents a populated matrix entry 308 (e.g., or simply "populated entry 308") where the user in a corresponding column interacted with the content item in a corresponding row. To illustrate, if the first entry in row one, column one of the user behavioral matrix 302 is a populated entry 308 then the first user (corresponding to the first column) viewed the first content item (corresponding to the first row).

As FIG. 3 shows, the user behavioral matrix 302 may be sparse, or in other words, may include more missing entries, where no interaction occurred between a user and a content item, than populated entries. Further, as shown in the user behavioral matrix 302, columns that include a larger number of populated entries 308 indicate an active user that views a number of different content items. Likewise, rows that include a number of populated entries 308 indicate a popular content item (e.g., the content item is viewed by a number of different users).

Upon obtaining or generating the user behavioral matrix 302, the machine learning system 102 determines latent representations. More specifically, the machine learning system decomposes the user behavioral matrix 302 to identify latent representations or factors. For example, as shown in FIG. 3, the machine learning system divides the user behavioral matrix 302 into two smaller matrices—matrix Y corresponding to content item latent factors 310a and matrix X corresponding to user latent factors 310b, where d (shown as 312a, 312b) is the dimensionality of each of the two smaller matrices Y and X. The machine learning system factors or decomposes the user behavioral matrix 302 such that V=XY or [User Behavioral Matrix]=[Content Item Latent Factors Matrix]·[User Latent Factors Matrix]. Further detail about factoring a user behavioral matrix is provided below in connection with a provided example embodiment.

Upon determining the content item latent factors 310a and the user latent factors 310b, the machine learning system uses to learn features of the content items. For instance, as described above, the machine learning system generates pseudo classes from the content item latent factors 310a by grouping corresponding content item latent factors 310a into clusters. Generally, and as mentioned above, latent factors from the user behavior data reveal some properties of the content items. Further, since the latent factors also serve as an implicit supervisor in feature learning, the machine learning system may naturally learn what information the latent factors have captured about the individual content items and whether the assumptions of the correlation structure are valid.

Using the pseudo classes of content items, the machine learning system can train a machine-learning model. Once the machine-learning model is trained, the machine learning system can extract content item features from the trained machine-learning model. Finally, and as described above, the machine learning system can use the learned content item features extracted from the trained machine-learning model in various machine learning applications.

More specifically regarding the social media data used to construct the user behavioral matrix 302, the machine learning system 102 can adapt or otherwise process the social media data to allow for accurate feature learning. For example, in one or more embodiments, the social media data is implicit social media data relating to one or more content items. In other words, the social media data indirectly reflects a user's opinion of the content items. For example, if a user views over a threshold number of photographs in a particular artist's photo gallery, the user is implicitly indicating a preference for photographs taken by the particular artist. Further, if a user views content items from various artists, there is a likelihood that the user sees and likes common features and styles between the various artists. In some cases, while the user may not cognitively recognize the commonalities between content items by the various artists, the user may subconsciously prefer common features and styles shared between content items by the various artists. As such, the social media data can capture implicit behaviors of users as the users interact with content items.

Further, by using implicit social media data, the machine learning system 102 can obtain a larger amount of user behavioral data. In general, users access and interact with multiple content items. Further, more users will view a content item than appreciate or comment on the content item. Thus, while capturing user behavior data corresponding to users' explicit feedback can result in an adequate amount of user data, the amount of user behavior data that a social media system can collect with regard to users' implicit behaviors is vastly larger. Further, by implicitly collecting data for each user that visits the social media system and interacts with content items, the social media system can assemble a large amount of user behavioral data, even when users do not expressly provide the data.

Compared with explicit feedback data, such as user ratings about movies on a streaming application or about products on a shopping, where a user gives explicit positive or negative feedbacks, implicit feedback data is often more general. As a result, the social media system can gather implicit feedback on a much larger scale. For example, a shopping website can collect more information pertaining to clicks and views for product than the shopping website can collet from user reviews or comments.

It should be noted, however, in some cases, implicit feedback data is noisier and weaker indication of the users' true opinion. Since implicit feedback data does not contain explicit negative signals, it can be difficult to identify negative signals from the missing data, because a missing entry could either be a sign of dislike or a sign that the user not yet discovered the content item. As another issue, given the massive amount of content items in social media, in some instances, the social media data is often extremely sparse (e.g., over 99% entries may be missing). While it is likely that most of the missing entries are the result of users not yet discovering and viewing content items, the machine learning system may not definitively determine the reason behind a missing content item entry.

While the social media data may be implicit, the machine learning system 102 may additionally or alternatively receive explicit data from a social media system. For example, the social media system may include in the social media data when a user "likes," appreciates, down-votes, or comments on a content item in addition to when the user views the content item. Similarly, when a user provides a rating for a content item, such as three out of five stars, the social media system may include the rating as part of the social media data.

After obtaining the social media data, the machine learning system 102 can organize, populate, factor, and regularize the social media data. For example, in one embodiment, the machine learning system 102 populates the social media data with sample data based on the sparsity of the social media data. As an overview, sparse social media data is the result of empty or missing data. In addition, despite implicit social media data being abundant, implicit social media data is generally sparse. Similarly, explicit social media data is often sparse as well. To illustrate why social media data is generally sparse, consider a social media system that includes 100 users and 100 content items. To fully populate the social media data, each user interact would need to interact with each of the content items. If, however, each user on average only viewed 20 content items, the social media data would be 80% empty. In this case, the social media data would include 2,000 content item interactions, but 8,000 missing interactions. In other words, for every content item with which a user interacted, the social media data includes a data point, and for every content item with which the user did not interact, the social media data is missing a data point. Thus, if the social media data includes a data point each time a user viewed a content item, the missing data would represent where the user did not view a content item. The machine learning system 102 determines the sparsity of the social media data by comparing the amount of populated data to the amount of missing data.

In some example embodiments, the machine learning system 102 determines that the social media data is sparse when the missing or empty data reaches a threshold percentage of the total data. For example, the machine learning system 102 may determine that the social media data is sparse when 30%, 50%, 60%, 75%, 80%, or 90% of the social media data is missing. Alternatively, the machine learning system 102 may determine the social media data is sparse when over 99% of the social media data is missing. Social media data that is over 99% sparse in not uncommon with datasets that include users and/or content items in the order of millions.

If the machine learning system 102 determines that social media data is sparse, the machine learning system 102 can populate a portion of the missing data. For example, the machine learning system 102 can populate missing data until the percentage of missing data in the social media data drops below a threshold value. For instance, if the threshold for sparsity is 95%, the machine learning system 102 populates missing data until less than 95% of the data is missing in the social media data.

Even when social media data is sparse, the existing social media data does have structure. As such, the machine learning system 102 can exploit the structure to overcome the sparsity and noise issues to create latent representations. Generally, with many content items, one may infer that if two content item have similar features (e.g., two images are visually similar), then the two content items will be equally viewed, liked, appreciated, commented on, etc., by users. Using this inference, the machine learning system 102 can populate data in the sparse matrix.

To illustrate, in one or more embodiments, the machine learning system 102 populates missing data in the social media data by using sample data. Sample data includes positive and/or negative data. The machine learning system 102 estimates the sample data and populates missing data proportionally to the popularity of each content item. As an overview, the popularity of a content item is the measure of how much exposure the content item receives from users. The manager 204 can add both positive and negative sample data to both popular and unpopular content items.

By populating the missing data with sample data, the machine learning system 102 cam both improve the sparsity of the social media data as well as the robustness of the social media data. In general, the machine learning system 102 may add more negative samples to the social media data than positive samples for a content item. As an initial matter, the machine learning system 102 may add more negative samples to the social media data than positive samples for a content item because the social media data may not initially include any indications of negative data. For instance, if the social media data indicates when a user views a content item, the social media data may include positive data for when the user viewed the content item. When the social media data is missing data for a user view for a content item, it is unclear whether the data is missing because user purposely choose not to view the content item, or because the user has not yet discovered the content item.

In any case, using the missing data in the social media data, the machine learning system 102 can make inferences about one or more of the missing entries using the social media data and populate the missing data proportionally to the structure of the existing data. Generally, missing data for a content item often suggests a negative attitude of users towards the content item. More specifically, data for a content item may be missing because a user has not viewed the content item and the user may not have viewed the content item because the content item itself was not popular. Further, users generally interact with similar content items because similar content items have share styles and features that are pleasing to the user. Thus, if a user has not interacted with a content item, the content item likely does not include features and styles that are similar to features and styles preferred by the user.

Applying the assumptions described above how missing data likely indicates negative users attitudes towards content items, in some embodiments, the machine learning system 102 increases the number of negative samples added to the missing data compared to the number of positive samples added to the missing data. For example, the machine learning system 102 may add twice as many negative samples (e.g., add samples to the missing data at the ratio 2:1 negative samples to positive samples). Alternatively, the machine learning system 102 may apply another ratio, such as one specified by an administrator, when adding positive and negative samples to the missing data. Overall, by populating the social media data with additional data samples, in many cases, the machine learning system 102 increases the quality and robustness of the social media data, which will improve machine learning, as described below.

As briefly mentioned above, in some example embodiments, the machine learning system 102 can factorize, regularize, and filter the social media data. Factorization and regularization of the social media data is described in detail below. Filtering the social media data will now be described. The machine learning system 102 can filter the social media data by removing outliers from the social media data. For example, content items with too many or too few user interactions can lead to the machine learning system calculating incorrect latent factors so removing outliers improves the quality and reliability of the social media data. Further, removing outliers from the social media data can also help with the sparsity problem described above.

As an example of removing content items from the social media data, the machine learning system 102 removes content items that do not satisfy a minimum and/or maximum threshold value. To illustrate, the machine learning system 102 can remove content items that have ten views or less and/or that have over 20,000 views. Alternatively, the machine learning system 102 can use a top percentage and/or bottom percentage to determine which content items to remove from the social media data. For instance, the machine learning system 102 can remove the top 5% of content items in the social media data (e.g., content items that have the top 5% of user interactions associated with them) and/or remove the bottom 10% of content items that have the fewest number of interactions. As another alternative, the machine learning system 102 removes a predetermined number of content items from the top and/or bottom of the social media data. For example, the machine learning system 102 can remove the fifteen lowest content items (e.g., fifteen content items having the lowest number of user interactions) from the social media data. As still another example, the machine learning system 102 removes all content items associated with the fifteen lowest number of user interactions.

As similar to removing content items from the social media data that include too many or too few user interactions, the machine learning system 102 can also remove users from the social media data that are too active or not active enough. For example, the machine learning system 102 can remove users from the social media data based on minimum or maximum activity thresholds or percentages. Further, the machine learning system 102 can remove a predetermined number of users from the social media data similar to removing content item described above (e.g., top and bottom 15 active users). Regardless of what method the machine learning system 102 uses to remove content items and/or users from the social media data, the machine learning system 102 can choose threshold values, percentages, or values that maximize the amount of quality data that is retained in the social media data while also trying to increase the density of the social media data.

Further, as briefly mentioned above, in one or more embodiments, the machine learning system 102 divides the social media data. More specifically, the machine learning system 102 divides the social media data into two portions for training and testing. For example, the machine learning system 102 splits the majority of the social media data into a training portion and the remainder of the social media data into a testing portion.

In some instances, the machine learning system 102 divides the social media data based on the non-missing data in the social media data. To illustrate, the machine learning system 102 divides the majority of non-missing data (e.g., 95%) into a training data set and the remainder of the non-missing data (e.g., 5%) into a testing data set. Further, the machine learning system 102 can divide the missing data points proportionally among the training data set and the testing data set. As described below, the machine learning system 102 uses the training and testing data sets for training a machine-learning model and validating learned content item features.

In one or more embodiments, the machine-learning model can comprise a neural network. As used herein the term neural network refers to a machine-learning model that uses statistical learning algorithms that are used to estimate or approximate functions that can depend on a large number of inputs in a non-linear, distributed, and parallel manner. A computer learning neural network is an interconnected group of nodes, called neurons. A neural network may include input nodes, output nodes, and intermediary nodes. The connections between each node may be weighted with a set of adaptive weights that can be tuned by a learning algorithm, and are that capable of approximating non-linear functions of their inputs. In general, a neutral network learns how to correctly classify objects through a process called training, described above.

One example of a neural network is a convolutional neural network (CNN). When used for image recognition, a CNN consists of multiple layers of small neuron collections that look at small portions of the input image at a time. The results of these collections are then tiled to overlap, which provides a better representation of the original image. A CNN with multiple intermediary layers may be referred to a deep convolutional neural network (DCNN).

In some embodiments, the machine learning system 102 may use a deep convolutional neural network (DCCN) as a machine-learning model. For instance, the machine learning system 102 can use a DCNN to learn from the pseudo classes in a supervised way. As such, the machine learning system 102 can train the DCNN how to correctly classify future content items provided to the DCNN via machine learning.

One example DCCN includes five convolutional layers and two fully connected layers, to learn a k-way DCNN classification model. From the trained DCNN, the machine learning system 102 can extract high-level content item features from the social media data. While a sample DCNN is described, one will appreciate that the machine learning system 102 may employs various different DCNN models. For example, the DCCN may vary in size, uses any number of layers and/or connections, and may modify how the connections are connected.

Alternatively, rather than training the DCCN with the clusters and/or pseudo classes, the machine learning system 102 can train the DCNN by applying a regression function directly from the content items directly based on their latent representations. In this manner, the machine learning system 102 may define a continuous mapping between the content items and latent representations rather than using clustering to train the DCNN. For example, if the content items are images, the machine learning system 102 may use the image pixels in a regression function to train the DCNN.

In some example embodiments, the machine learning system 102 can employ this alternative approach to overcome the cold start problem. Further, along with apply a cold start algorithm, the machine learning system 102 can formulate a joint cost function as:

$$|Z - XY| + \lambda(|X| + |Y|) + \mu \sum_{\{i,j\}} |x_i - x_j| x_i \sum_{\{i,j\}} |f(I_j) - P_{x_i}| \qquad (0)$$

subject to $P \cdot P^T = I$. As such, the joint learning formulation allows for iterative refinement between $x_i$, $y_j$, and function $f$, that goes from content item ($I_i$) to a latent representation ($x_i$). In some example embodiments, the function $f$ may be learned as part of the cold start algorithm.

Regardless of how the machine learning system 102 trains a neural network or if the machine learning system 102 employs a DCNN, the machine learning system 102 may use a neural network to extract features related to the content items and/or users. For example, if the machine learning system 102 trains a neural network using content item latent representations, the machine learning system 102 may extract content item features from the trained neural network. Once extracted, the learned features can reveal properties corresponding to the social media data, such as properties of the content items.

In some example embodiments, the machine learning system 102 may optimize or otherwise improve the efficiency of the machine learning process through training and testing. As described above, the machine learning system 102 can divide the social media data into a training data set and a testing data set. Using the training data set, the machine learning system 102 can train and refine a neural network's ability to correctly perform machine learning. Further, using the training data set, the machine learning system 102 can perform validation to determine the accuracy of the neural network in classifying content items. For example, the machine learning system 102 may validate results of the neural network using root-mean-square error (RMSE) measurements, and based on the results, the machine learning system 102 may refine the training of the neural network to improve future outcomes.

The machine learning system 102 can also use the testing data set to measure and refine a neural network to improve machine learning. More specifically, the machine learning system 102 can provide a content item from the testing set to the trained neural network and analyze the results. To illustrate, when a content item from the testing data set is input into the neural network, the neural network identifies the content items from the training data set that are the nearest neighbors in latent factor space. In other words, the neural network can identify content items from the training data set that share similar semantics and contexts.

In one or more embodiments, the machine learning system 102 compares the input content items from the testing set with corresponding nearest neighbors identified from the training data set to test the effectiveness of the learned features. For example, the machine learning system 102 can analyze the cosine similarities and/or the coarse and fine level semantics proximities between the two data sets to determine if the cosine values are within a threshold range of each other. Additionally or alternatively, a user can manually compare the features and styles of the two data sets and indicate to the machine learning system which identified content items from the training data set are similar to the corresponding query content items from the testing data set.

Figure 4:
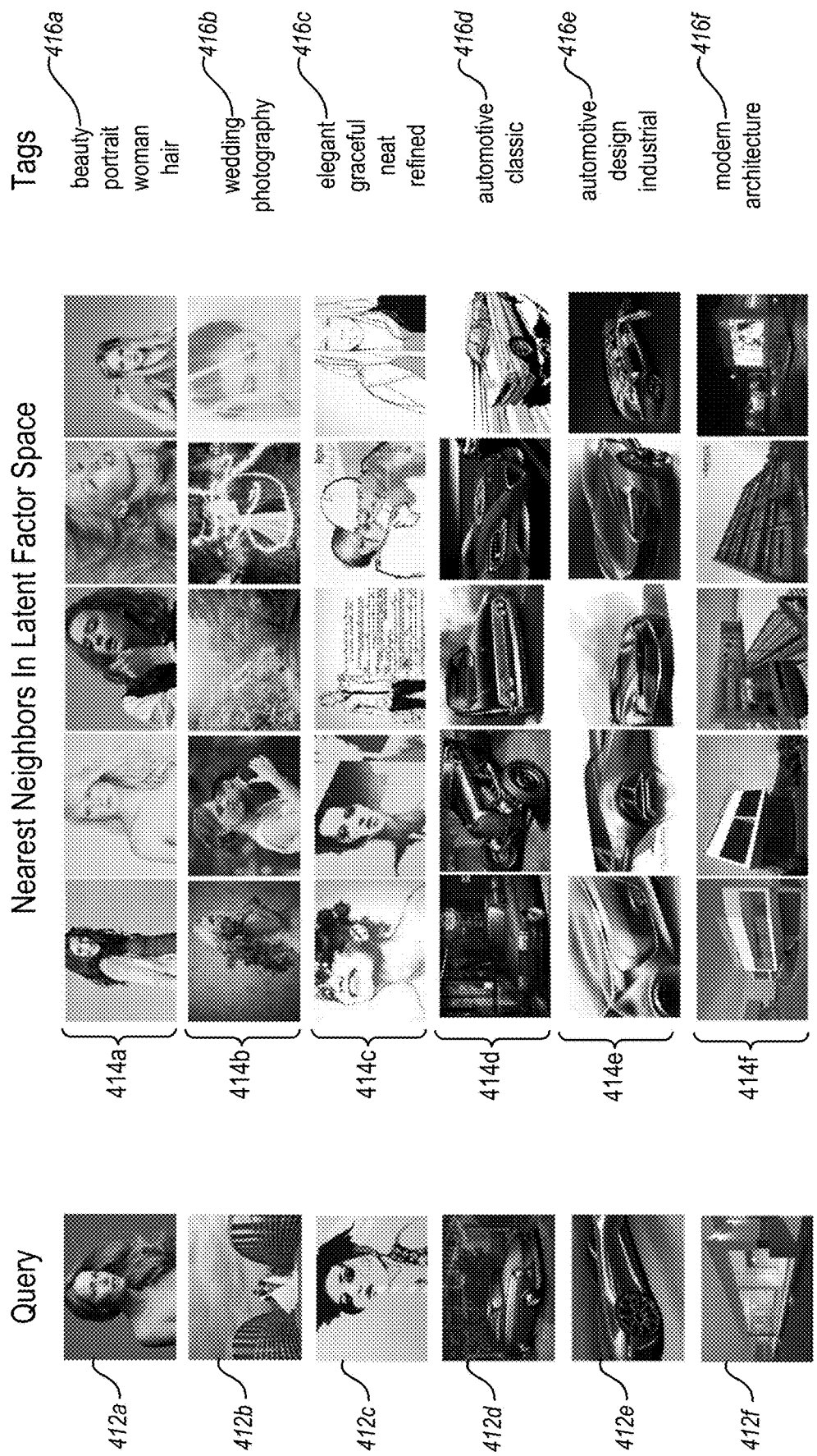
FIG. 4 illustrates example content item query results in accordance with one or more embodiments.

To show how the machine learning system can use a trained machine-learning model in a machine learning application, FIG. 4 illustrates example content item query results in accordance with one or more embodiments. In particular, FIG. 4 illustrates query images 412a-f and corresponding nearest neighbor images 414a-f in latent factor space. As shown, the first three query images 412a-c and corresponding nearest neighbor images 414a-c show portraits of women. The fourth and fifth query images 412d-e and corresponding nearest neighbor images 414d-e show automotive design images. Further, the sixth query image 412f and corresponding set of nearest neighbor images 414f shown images of houses.

FIG. 4 also illustrates tags 416a-f. It should be noted that the tags 416a-f, which were submitted by users of a social media system, are displayed for illustrated purposes only and that the machine learning system used to produce the results shown in FIG. 4 did not access or consider the tags 416a-f when training or identify nearest neighbor images 414a-f. As stated earlier, the embodiments of the machine learning system described herein do not need to use using content item tags or labels when may training or identify content items features.

As stated above, FIG. 4 corresponds to a machine learning system that provides nearest neighbor images 414a-f as a result of an image query 412a-f. The machine learning system corresponding to FIG. 4 exemplifies a machine learning system trained with social media data from a social media system in any suitable manner as described herein, where the social media data includes user behavior data that indicates when users of the social media system viewed images on the social media system.

Using the social media data, the machine learning system was trained to recognize image features. As such, when an image was submitted to the trained machine learning system in a query, the machine learning system identified similar features in other images that matched features in the query image. The machine learning system then classified resulting images with the most overlapping as nearest neighbors to the query image. More specifically, for each query image, the machine learning system identified one or more nearest neighbors from the training set by determining the cosine-distance between the query image and the nearest neighbors. As a result, there is a strong visual and semantic proximity between query images and their nearest neighbors identified by the machine learning system. Further, the strong visual and semantic proximity between query content items are consistent across the entire set of nearest neighbors.

As FIG. 4 illustrates, the first query image 412a illustrates a portrait of a woman. The first set of nearest neighbor images 414a in the latent factor space also show portraits of women. Likewise, the other query images 412b-f show correspond different sets of nearest neighbor images 414b-f. As shown in FIG. 4, the nearest neighbor images 414a-f share similar visually apparent semantics and contexts as their corresponding query images 412a-f.

The machine learning system can effectively capture both coarse and fine level semantics, as FIG. 4 illustrates. More specifically, while the first three query images 412a-c display images of women, the machine learning system was able to identify contexts and styles unique to each query image and provide corresponding nearest neighbor images that match the contexts and styles of the query images. To further illustrate, the fourth query image 412d and the fifth query image 412e both display automobile styles (e.g., identifying an automobile in the image involves coarse level semantics). The fourth query image 412d, however, is an image of a classic car while the fifth query image 412e is an image of a more modern industrial car (e.g., identifying the style and classifications of automobile involves fine level semantics). As shown by the corresponding nearest neighbor images 414d-e, the machine learning system correctly detected, identified, and matched the coarse level semantics and fine level semantics in response to the fourth query image 412d and the fifth query image 412e.

As described above, in one or more embodiments, the machine learning system uses machine learning to learn features of content items based on social media data. One example embodiment of such a machine learning system is described below, which details how the machine learning system uses various algorithms and methods to optimize or otherwise improve the machine learning process. For example, in the embodiment described below, the machine learning system uses singular value decomposition based collaborative filtering to improve machine learning and, as a result, improve its ability to identify and recommend content items in response to query content items.

To illustrate, the present embodiment provides a framework that unifies latent factor analysis with a deep convolutional neural network for image feature learning from social media. As described above, a social website can harvest rich social information can, such as content items, item tags, user social friendships, user views, and comments. In the present embodiment, the machine learning system uses social media data that includes user-image view data. In other words, the social media data that the machine learning system uses in the present embodiment includes data that indicates which users viewed which images on a social media system. One will appreciate that the user-image view data provides minimal information of whether or not a user viewed a particular image, and may be classified as implicit data. One will further appreciate that while the machine learning system in the present embodiment relates to user-image view data, the same general feature learning framework described with respect to the present embodiment also applies to other types of social media data, such as user-video data or user-audio.

For purposes of the present embodiment, consider an environment having a set of content images $I=\{I_1, \ldots, I_M\}$ and a set of users $U=\{U_1, \ldots, U_N\}$, where the corresponding user-image view data is in the format of a user-image view matrix between I and U, which is denoted as $V \in \mathbb{R}^{M \times N}$. By using the user-image view matrix, the machine learning system can use the social media data to encode amply amounts information about the similarities between different images, which the machine learning system can then use for supervised image feature learning.

Within the user-image view matrix V (or simply "view matrix V"), if a user $U_j$, viewed a image $I_i$ at least once, then the machine learning system can set the corresponding entry in the user-image view matrix V to a positive value (e.g., $V_{ij}=1$). Otherwise, if the user $U_j$ did not view the image $I_i$, the machine learning system can set the corresponding entry in the view matrix V to a negative value (e.g., $V_{ij}=-1$). In this embodiment, a negative value in an entry of the view matrix indicates a missing entry, however, it should be appreciated that any values may be used to indicate when a user views a image and when a user does not view a image. In other words, while $-1$ is used to denote missing entries, a value of $-1$ does not signal a negative user response in the view matrix V.

As an overview, the machine learning system of the present embodiment uses collaborative filtering to decompose the view matrix V into the product between image latent factor and user latent factors. In general, images latent factors can define a continuous mapping between the visual images and latent factors. Further, because the latent factors of images encode rich information about the similarity between the images, the machine learning system can use the latent factors to generate pseudo classes for the images by clustering their corresponding latent factors into groups using K-means. Once the latent factors are divided in pseudo classes, the machine learning system can then train a deep convolutional neural network (DCNN). More specifically, the machine learning system can train the perform supervised training on the DCNN using the pseudo classes. After the machine learning system trains the DCNN, the machine learning system extracts content features for the domain(s) corresponding to the social media data from the trained DCNN. The machine learning system of the present embodiment will now be described in additional detail.

As an initial matter, because the view matrix V includes implicit data, the majority of entries in view matrix V may be missing. To combat the issue of missing entries, the machine learning system may probabilistically populate a large number of the missing entries with sample entries, and sample "negatives" entries in particular. More specifically, when populating entries in the view matrix V with samples, the machine learning system may follow a sampling probability distribution that is proportional to the popularity of the content within the view matrix. As used herein, the popularity of an image is proportional to the amount of exposure the image receives from users, (e.g., the number of users that view an image). The rationale behind using a sampling probability distribution that is proportional to the popularity of the content is that a popular content has a higher chance of being discovered by a user, and therefore, a missing entry is more likely to suggest a negative attitude of the image by the user.

To illustrate how the machine learning system may follow a sampling probability distribution that is proportional to the popularity of the content, consider the popularity ($p_i$) for item $I_i$ in the view matrix V defined as:

$$p_i = \sum_{\{j: V_{ij}=1\}} V_{ij}, \quad (1)$$

which represents the sum of all users who viewed image $I_i$. Based on the content popularity, the sampling distribution for negative data is defined as:

$$P_{r_{ij}} \propto \begin{cases} p_i, & V_{ij} = -1 \\ 0, & V_{ij} = 1 \end{cases}, \quad (2)$$

which represents the sampling probability being proportional to the popularity ($p_i$) when $V_{ij}=-1$, and the probability being proportional to 0 when $V_{ij}=1$. In other words, the machine learning system can skip sampling entries that are positive (e.g., 1) when apply the sampling probability to missing entries of the view matrix V.

Further, in some instances, the machine learning system can take the logarithm of $V_{ij}$, and normalize $P_{r_{ij}}$ with respect to each user so that, for each user, the sampling probabilities sum up to 1. Algorithm 1, provided below, provides a description of the sampling process the machine learning system uses in the present embodiment to determine negative data, where $\mathcal{N}$ is the set of sampled negative view entries. Additionally, for every missing entry, $V_{ij} \in \mathcal{N}$, the machine learning system can set $V_{ij}=0$ for further analysis:

---
Algorithm 1: Negative Sampling
---
Input: Initial view matrix view matrix $V \in \mathbb{R}^{M \times N}$, sample probability $P_{r_{ij}}$, number of negatives to sample $n_j$ for each user.
Output: Updated view matrix with negative sample set
1.     $\mathcal{N} \leftarrow \Phi$
2.     for j = 1, . . . , $\mathcal{N}$ do
3.        $\mathcal{N} \leftarrow n_j$ (negatives sample according to $P_{r_{ij}}$)
4.        $\forall_i \in \mathcal{N}, V_{ij} = 0$
5.     end for
---

As mentioned above, the machine learning system can perform matrix factorization to the view matrix V as part of the collaborative filtering and latent factor analysis. After updating the view matrix V to include both observed positive entries along with positive and/or negative sampled entries, the machine learning system of the present embodiment uses a matrix factorization model on the view matrix V. As such, the machine learning system factors the view matrix V into two smaller latent factor matrices: a user latent matrix and an image factor matrix. As a more detailed example, using a matrix factorization model, the machine learning system associates each user $U_j$ with a user latent factor vector $x_j \in \mathbb{R}$ (where d<<|U| is the dimension of the latent space in the user latent factor vector). In addition, the machine learning system associates each image $I_i$ with an image latent factor vector $y_i \in \mathbb{R}^d$ (where d<<|I| is the dimension of the latent space in the image latent factor vector). Further, the machine learning system makes a prediction for an entry $V_{ij}$ by taking the inner product between the two latent factors, i.e., $\hat{V}_{ij} = y_i^T x_j$.

Further, the machine learning system can apply regularizations to the matrix factorization model. In general, regularization is tuning or selecting the preferred level of model complexity so that a model is better at predicting (generalizing) desired outcomes. Regularization adds a weight ($\lambda$) to a model that penalizes overly complex models. In some example embodiments, failure to perform regularization may result in a model being too complex, which results in overfitting. Conversely, if the model is too simple, failure to perform regularization may result in underfitting. In other words, when latent space has a very high dimensional latent space (e.g., a large d), the high dimensional latent space may cause overfitting and increase computational cost. On the other hand, a low dimensional latent space may fail to properly capture the latent structure. The machine learning system of the present embodiment can perform matrix factorization with regularizations using the following cost equation:

$$\min_{x_*, y_*} \sum_{V_{ij} \neq -1} (V_{ij} - y_i^T x_j)^2 + \lambda(\|x_j\|^2 \|y_i\|^2), \quad (3)$$

where $\lambda$ is the weight placed on the regularization term. In one or more alternate embodiments, the machine learning system may use an alternative function to perform regularization, such as a common L2 regularization with a cost function: |V−XY|+$\lambda$(|X|+|Y|), where V is the view matrix, $\lambda$ is the weight placed on the regularization term, X is an item latent factor matrix, and Y is a user latent factor matrix. Further, as described above, V=XY.

In some alternate embodiments, the machine learning system performs the summation of the above regulation equation (i.e., Equation 3) over the "non-missing" entries in the view matrix V, including both the observed entries and the sampled entries. Alternatively, the machine learning system performs the summation of the regulation equation over all entries in the view matrix V.

Returning to the machine learning system of the present embodiment, the machine learning system can employ stochastic gradient descent (SGD) to solve the regulation equation (e.g., Equation 3). As used herein, the term "stochastic gradient descent" (SGD) refers to a gradient descent optimization method for minimizing an objective function that is written as a sum of differentiable functions. SGD is often used in machine learning when training to find a convergence solution. One particular method of SGD is called, asynchronous stochastic gradient descent (ASGD). More specifically, at each iteration of SGD, the machine learning system randomly picks a single non-missing entry in the view matrix V and calculates partial gradients with regard to the involved $x_j$ and $y_i$ in order to update the partial gradients.

Further, the machine learning system can additionally improve the optimization efficiency of the view matrix V by using asynchronous SGD (ASGD). By using ASGD, the machine learning system may update parameters for multiple non-missing entries of the view matrix V in parallel. As a note, because the view matrix can be extremely sparse, the chances that the machine learning system will run into a conflict when updating parameters using ASGD are very low. Further, as another note, empirical testing has shown that ASGD can significantly speed up the optimization of regularization without comprising the quality of the solution while maintaining a stable convergence behavior.

As an alternative to optimizing the view matrix V in parallel using ASGD, in some example embodiments, the machine learning system optimizes one row and column of the view matrix at time. As the machine learning system optimizes single rows and columns, the machine learning system can also apply appropriate weight to each optimized row and column. When the size of the view matrix is too large to process in parallel, optimizing individual single rows and columns may provide the machine learning system a more feasible method to perform optimizations.

As mentioned above, the machine learning system of the present embodiment can perform clustering on the image latent factors. To illustrate, the machine learning system can first cluster the image latent factor space into k clusters $\{a_1, \ldots, a_K\}$ using a k-means clustering. The term "k-means clustering," as used herein, refers to a method of vector quantization that is used in data mining. In k-means clustering, n observations are partitioned into k clusters in which each observation belongs to the cluster with the nearest mean, serving as a prototype of the cluster. K-means clustering is a method of vector quantization, having the aim of partitioning n observations into k clusters, where each observation belongs to the cluster with the nearest mean. Additionally, k-means clustering is an iterative process that repeats until the clusters are balanced. In k-means clustering, k is a randomly chosen number (e.g., 200, 500, 100, 2000, 5000, etc.), and each cluster is assigned a corresponding cluster index number.

Once the images latent factors are clustered into k clusters, the machine learning system creates pseudo classes $\{c1, \ldots, c_K\}$. More specifically, the machine learning system partitions each image latent factor based on its corresponding assigned cluster index number. In particular, the machine learning system creates pseudo classes according to the following equation:

$$c_k = \{I_i: y_i \in a_k\}. \quad (4)$$

As a note, pseudo classes may represent a lossy vector quantization coding transform.

As an alternative to the clustering/pseudo method described above, in one or more alternate embodiments, the machine learning system uses a soft assignment or soft weighting approach. Under a soft weighing approach, the machine learning system assigns one image to multiple clusters. In other words, a image may have multiple cluster index numbers. To illustrate, under a soft weighing approach, the machine learning system determines, based on probability, distance to each cluster, and sparse coding, whether a image should be assigned one cluster or to multiple clusters. When the machine learning system uses soft weighting, the machine learning system may train a DCNN (described below) to identify the soft (or normal) weighting for the clustering and/or use regression algorithms to predict the weights to allows for some cluster overlapping.

As mentioned above, the machine learning system of the present embodiment can perform image feature learning using clusters the image latent factors. More specifically, the machine learning system uses the pseudo classes formed from the clusters of image latent factors to encode rich high-level visual and semantic information corresponding to the images. Further, the machine learning system uses the pseudo classes and/or clusters of image latent factors during supervised learning, which can allow the machine learning system to learn meaningful features of the images, such as high-level visual features of the images. For instance, the machine learning system may train a DCNN in a supervised manner using the clusters of image latent factors to learn high level features of the images.

To illustrate how the machine learning system users a DCNN to learn image features, the machine learning system of the present embodiment may employ a DCNN that includes five convolutional layers and two fully connected layers, to learn a k-way DCNN classification model. Through training the DCNN, the machine learning system may teach the DCNN how to recognize image features classify future images. Once trained, the machine learning system may use the trained DCNN to extract high-level visual features for the social content. Further, by the machine learning system using pseudo classes to train the DCNN (e.g., through supervised training), the machine learning system may then be able to employ a softmax loss function that is robust to outliers.

As a note, in some instances, because latent factor space is continuous, training a DCNN using the above described methods may cause a suspected quantization problem. As such, in some embodiments, the machine learning system may alternatively employ a DCNN regression function directly from the images latent factors rather than using clustering when training the DCNN.

Behance 2M Dataset.

To validate the present embodiment described herein, empirical social media data was applied to the machine learning system of the present embodiment. The following description details how the empirical data was applied to machine learning system and corresponding results.

For the empirical social media data, a large-scale image and user behavior dataset was obtained from a social media website Behance.net (or simply "Behance"). Behance is a popular social media website for professional photographers, artists, and designers to share their work. Content items on Behance are mostly in the form of images, but there is also a small collected of videos. The content on is Behance very diverse, ranging from photographs to cartoons, paintings, typo-graphs, graphic design, etc. Further, content on Behance is publically available to users.

Content items on Behance are organized as and group with projects. Each project can be associated with one or more project fields. As of March 2015, Behance had 67 project fields. It should be noted, however, that project fields are coarsely categorized. As such the project fields often overlap into one or more other project fields. Accordingly, the fields are not suitable as labels for image classification training.

As background on the Behance dataset. A project owner of an image uploads into a project and picks a representative image to serve as a cover image for the project. While browsing over a large number of cover images, a user may click the cover image of interest to access other images with the corresponding project. Behance records the view data for each project including creating a list of which users have viewed a project.

Figure 5:
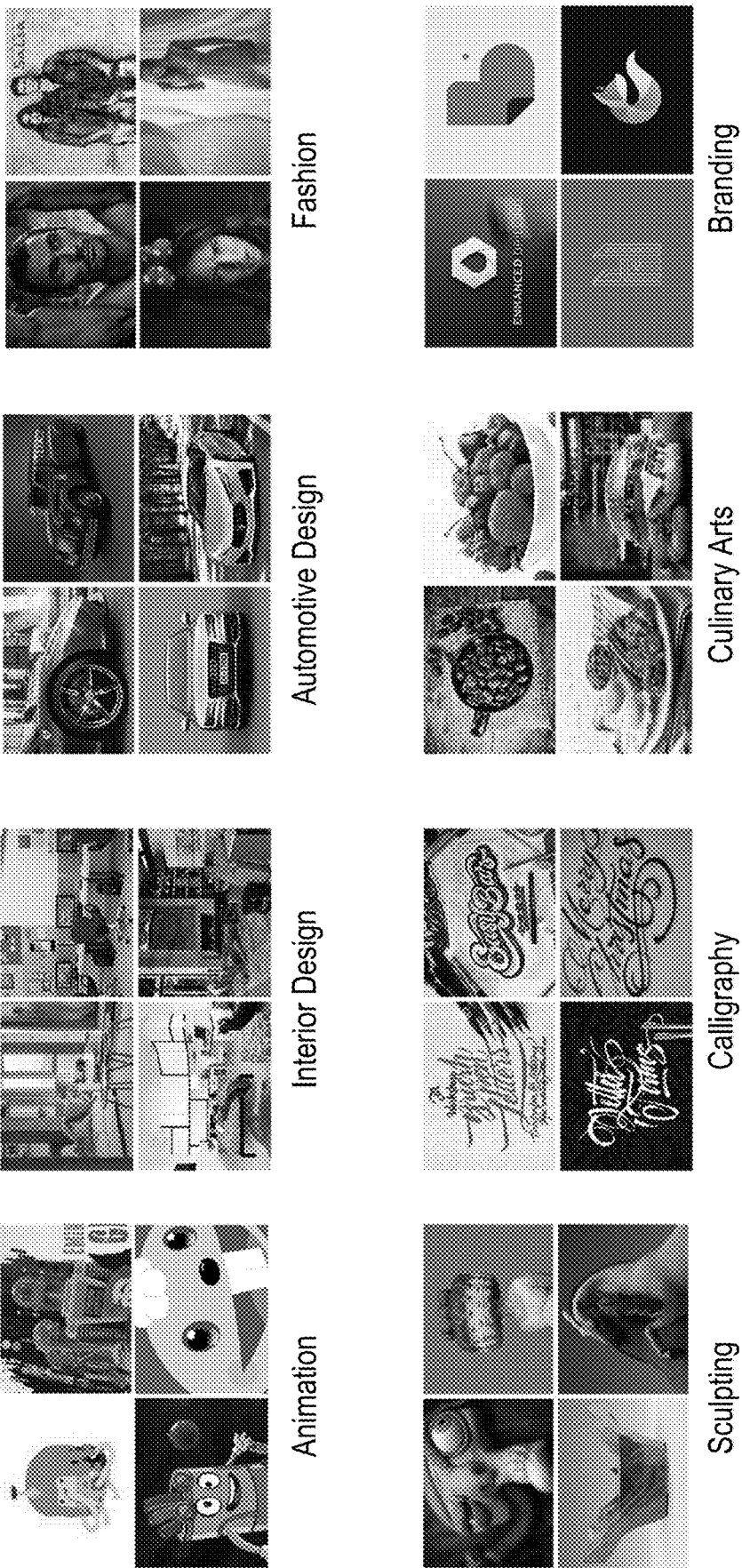
FIG. 5 illustrates a subset of images, from eight representative fields, taken from a dataset in accordance with one or more embodiments.

The Behance dataset includes 1.9 million project cover images from Behance. One will appreciate that while only cover images were included in the Behance dataset, it is possible to include all the images from Behance.com in the social media data. To provide better context, FIG. 5 illustrates a few representative images from the Behance dataset. The shown in FIG. 5 images are organized by project field. For example, the images in FIG. 5 are organized into the project fields of include animation, interior design, automotive design, fashion, sculpting, calligraphy, culinary arts, and branding. Because the project fields are generic, the machine learning system cannot use them as labels to learn image features. Further, as shown in FIG. 5, many of the images from the Behance dataset are of high quality (e.g., professional photos, artwork, and designs) and the images make up a diverse dataset covering many different domains.

In addition to images, the Behance dataset included a list users that viewed the images in the Behance dataset. In other words, the Behance dataset includes data corresponding to which users viewed which images in the dataset. Specifically, the Behance dataset includes 326 million image views from 1.9 million users, with many of the 1.9 million users viewing images in the dataset.

Unmodified, the density (e.g., ratio of missing entries to total entries) of the Behance dataset was about 0.0093%. In other words, a view matrix created from the Behance dataset resulted in extremely sparse dataset. Further, even after the machine learning system of present embodiment populated the view matrix with positive and negative samples (as explained in detail below), the view matrix was still over 99% empty (or less than 0.01%). To help put this into context, for the 1.9 million users, on average, each only viewed 175 projects out of 1.9 million projects.

The machine learning system transformed the Behance dataset into a view matrix. In addition, the machine learning system removed outliers from view matrix. In particular, the machine learning system removed the most popular and the least popular projects. Similarly, the machine learning system removed users who were found to be too active and not active enough. The minimum and maximum thresholds applied by the machine learning system for both the project view counts and the user view counts were less than 10 views and over 20,000 views. After applying the thresholds describe above, the resulting density of the view matrix increased to 0.0176%.

After obtaining and filtering the dataset, the machine learning system split the view matrix into a training dataset data and s testing dataset, as described above. More specifically, the machine learning system split the Behance dataset 95% for training ($t_r$) and 5% testing ($t_e$). Based on the split, the machine learning system created a training matrix $V_{tr}$ from the training dataset and a testing matrix $V_{te}$ from the testing dataset. More specifically, the machine learning system formed the training matrix $V_{tr}$ by selecting, from the view matrix V, the images belonging to the training dataset. Similarly, the machine learning system formed the testing matrix $V_{te}$ using images from the view matrix V belonging to the testing dataset.

As described above, the machine learning system used the training dataset for training a DCNN and the testing dataset for evaluating learned feature representation. Further, as described above, the machine learning system further divided the training dataset for validation purposes (e.g., specifically, using the non-missing entries only, the training dataset was split 80% for training and 20% for validation of the training) It should be noted that the machine learning system split is on the non-missing entries in $V_{tr}$ because the goal of latent factor analysis is to recover the missing entries in the view matrix V.

In connection with splitting the view matrix into the training dataset and the texting dataset, the machine learning system added positive and negative samples to the various dataset. As described above, adding positive and negative sample allows for better calculation of the latent factors for projects in the various datasets, such as the training dataset. As such, following Algorithm 1 provided above, the machine learning system added positive and negative samples to the training dataset. To further illustrate, for each user j in the training dataset, the machine learning system set the number of negative samples ($n_j$) for the user to be twice the number of positives entries for the user. After the machine learning system applied the negative sampling to the view matrix V, the density of the view matrix V increased to 0.0527%. Note, that as $n_j$ gets larger, the computational cost to solve Equation 3 (provided above) increases linearly, thus, for computational efficiency, the machine learning system limited the number of samples added to the training dataset.

Experiment Details

After the machine learning system populated a portion of the missing entries in the view training matrix $V_{tr}$ with samples, the machine learning system applied regularized matrix factorization on the training matrix $V_{tr}$. More specifically, the machine learning system used the validation data to determine an optimal regularization weight ($\lambda$). Further, the machine learning system performed validation by using root-mean-square error (RMSE) for predicting the validation split of the training matrix $V_{tr}$ with the inferred latent factors. Additionally, the machine learning system applied personalized ranking (PR) to measure the rank of positive and negative views for each user. Once the training matrix $V_{tr}$ was populated, regularized, validated, and measured, the machine learning system used the training matrix $V_{tr}$ to compute final latent factors using the optimal regularization weight ($\lambda$).

As an observation, through performing validation testing, setting $\lambda$ to 0.01 and d to 100 resulted in favorable RMSE and PR values, while keeping the computation efficient and not too complex. For example, under the setting $\lambda$ to 0.01 and d to 100, a validation RMSE of 0.2955 and PR of 0.1891 was achieved. It should be noted that small values for both RMSE and PR indicate a favorable performance. Further, the PR value of 0.1891 was better then the expected PR value of 0.5, which was estimated randomly.

Training with the Behance Dataset

Using training and testing datasets, the machine learning system of the present was used to train a neural network to identify image features. To illustrate, upon forming the training matrix $V_{tr}$ and the testing matrix $V_{te}$, the machine learning system decomposed the training matrix $V_{tr}$ to perform latent factor analysis, as described above. After the machine learning system calculated (e.g., learned) the image latent factors, the machine learning system applied k-means clustering to the learned image latent factors.

As an extra step, the machine learning system resized the training images so that the short side of each image was 256 pixels. Then, the machine learning system cropped the center of the resized images (e.g., 256×256 pixels). At the time of training, the machine learning system further randomly cropped the image to 224×224 pixels and uses the 224×224 pixel the training input. In some cases, randomly cropping a portion of a content item for training may increase the robustness of the dataset and improve training.

As described above, during training, the machine learning system can adapt to improve the training process. For example, the machine learning system may adapt dropout during training to avoid overfitting. As observed, during training, the machine learning system achieved convergence in approximately 60 epochs. Also, through training, the machine learning system extracted image features from fully connected layers in one or more DCNNs.

Image Similarities on Behance

The following section discusses image similarities and validation of the machine learning system described herein. As an overview, one can compare content item query and result similarities when determining the effectiveness of feature learning. As such, the following section measures how well the machine learning system of the present disclosure captures the concept embedded in the latent space compares to other current image recognition systems.

The first current image recognition systems test was IMAGENET (hereinafter "ImageNet feature"). The ImageNet feat used the ILSVRC2012 dataset. For purposes of the comparison test, the ImageNet feature was trained on an equivalent neural network using equivalent training procedures.

For the validation test, the images in the testing matrix $V_{te}$ where randomly queried against images in the training matrix $V_{tr}$ for each system. Image resemblances between the query images and corresponding identified images (i.e., nearest neighbors) were compared visually. The image resemblances were also compared quantitatively using cosine similarity to determine the cosine-distance between the query image from the testing matrix $V_{te}$ and each resulting image from the training matrix $V_{tr}$.

Figure 6:
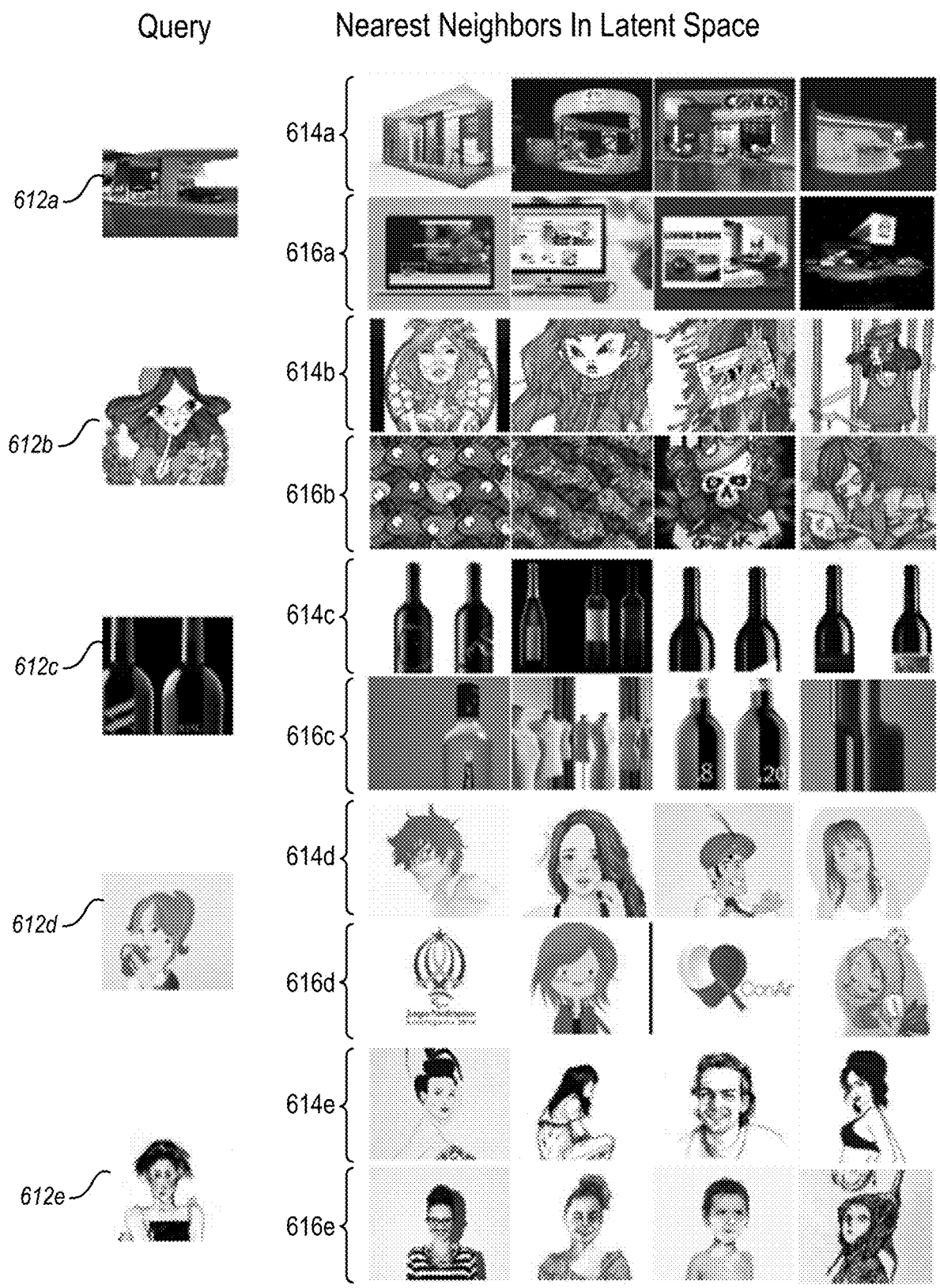
FIG. 6 illustrates a comparison of nearest neighbor image query results in accordance with one or more embodiments.

As shown in FIG. 6, the query images 612a-e were provided to the machine learning system disclosed herein and the ImageNet feature. The machine learning system disclosed herein returned the nearest neighbors 614a-e while the ImageNet feature returned the nearest neighbors 616a-e. Visually, the machine learning system disclosed herein returned images that better represented the query images 612a-e.

Furthermore, as mentioned above, the results between machine learning system of the present disclosure and the ImageNet feature were quantitatively evaluated. Specifically, two measurements were quantitatively evaluated using the nearest neighbors. The measurements go beyond visual similarities, and reflect the actual relationships between images on as found on the Behance website.

The first measurement evaluated the number of common viewers between the query image and the 100 closest nearest neighbors. In other words, the first measurement compared the number of a user viewed both a query image selected from the testing dataset and one of the nearest neighbor images selected from the testing dataset. The second measurement evaluated the number of times the owner of the query image viewed one of the retrieved nearest neighbors. Similarly, this quantity was measured between a query image and the top 100 closest nearest neighbors. In both measurements, the machine learning system disclosed herein outperformed the ImageNet feature. Specifically, there was greater viewing overlap and ownership viewing overlap between the query image and the evaluated nearest neighbors for the machine learning system disclosed herein.

Image Classification on Benchmarks

In addition to directly comparing the one or more embodiments of the machine learning system disclosed herein to other feature learning applications, image classifications results from the machine learning system were measured against standard benchmarks (e.g., benchmarks for object class classification and visual style classification). For the purpose of classification comparisons, Caltech256 was chosen for the object class classification. Additionally, social media data was also gathered from other asset sharing websites, such as Flickr Style, Wikipaintings, AVA Style. Flickr Style is an image site that has 80,000 images from 20 visual styles. Wikipaintings is a site that has 85,000 images from to 25 styles. AVA Style social media data consists of 14,000 images with 14 photographic styles.

The machine learning system disclosed herein was benchmark tested against ImageNet feature, described above, as well as another feature learning application, Meta-Class. It should be noted that the ImageNet feature is learned on the ILSVRC2012 dataset with 1,000 categorical labels, and Met-Class was trained on a subset of 8,000 synsets of the entire ImageNet database, whereas the machine learning system described herein learned features of the images using only noisy user-view data.

Each of the benchmark tests involved training a neural network using 2,000 pseudo classes. Additionally, for each of the benchmark tests, the training and testing datasets where each divided 80% for training and 20% for testing. As the exception, due to the smaller dataset, the benchmark test for Caltech256 used 50 images per category for training and 20 images for testing. Further, the benchmark test used linear SVM as the classification model.

Table 1 below shows the benchmark tests the results for image style classification. As shown, the machine learning system presently disclosed had similar or better accuracy than ImageNet feature and Meta-Class. As for object classification, the features obtained from the machine learning system produced competitive results on Caltech256.

TABLE 1

Classification Accuracy on Benchmarks (%).

| | The Machine Learning System | ImageNet Feature | Meta-Class |
|---|---|---|---|
| Flickr Style | 37.2 | 37.1 | 32.8 |
| Wikipaintings | 41.4 | 40.7 | 38.6 |

TABLE 1-continued

Classification Accuracy on Benchmarks (%).

| | The Machine Learning System | ImageNet Feature | Meta-Class |
|---|---|---|---|
| AVA Style | 56.0 | 51.3 | 53.9 |
| Caltech256 | 57.6 | 68.9 | 48.9 |

Figure 7:
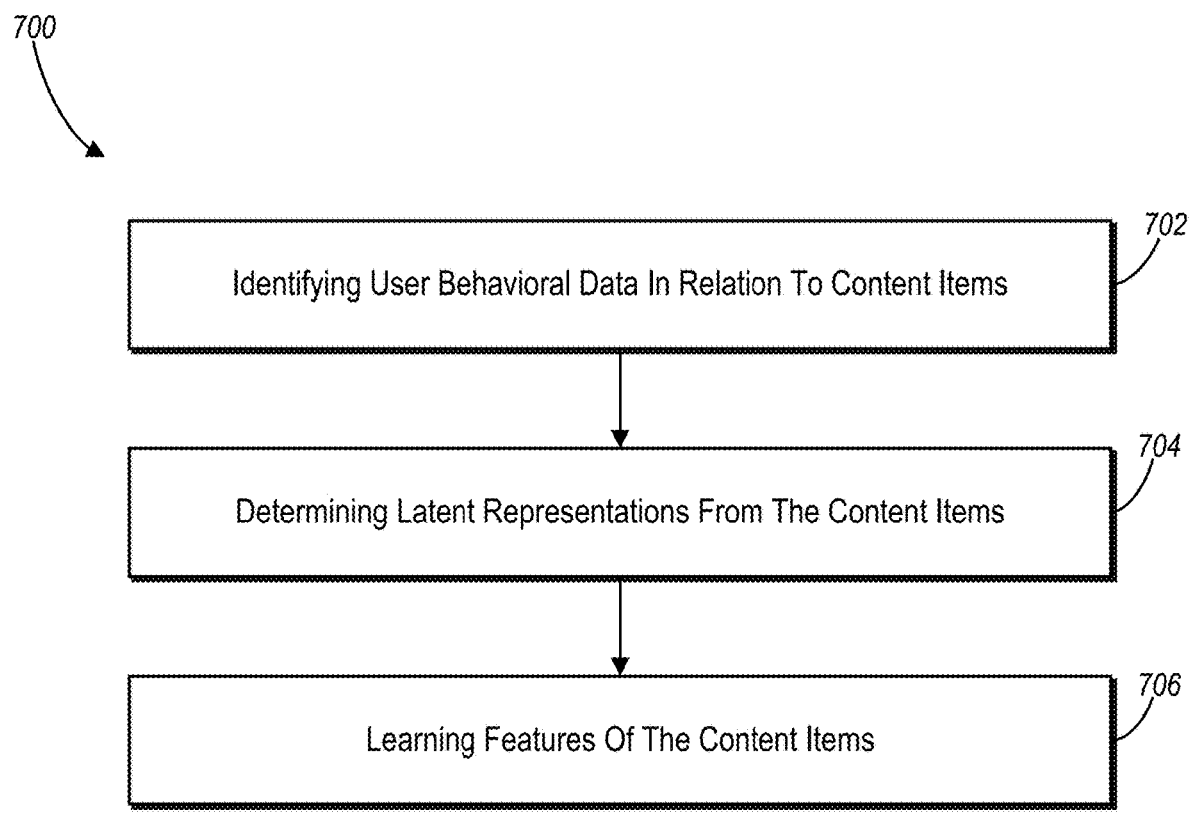
FIG. 7 illustrates a flowchart of a series of acts in a method of collaborative feature learning using unsupervised social media data in accordance with one or more embodiments.
Figure 8:
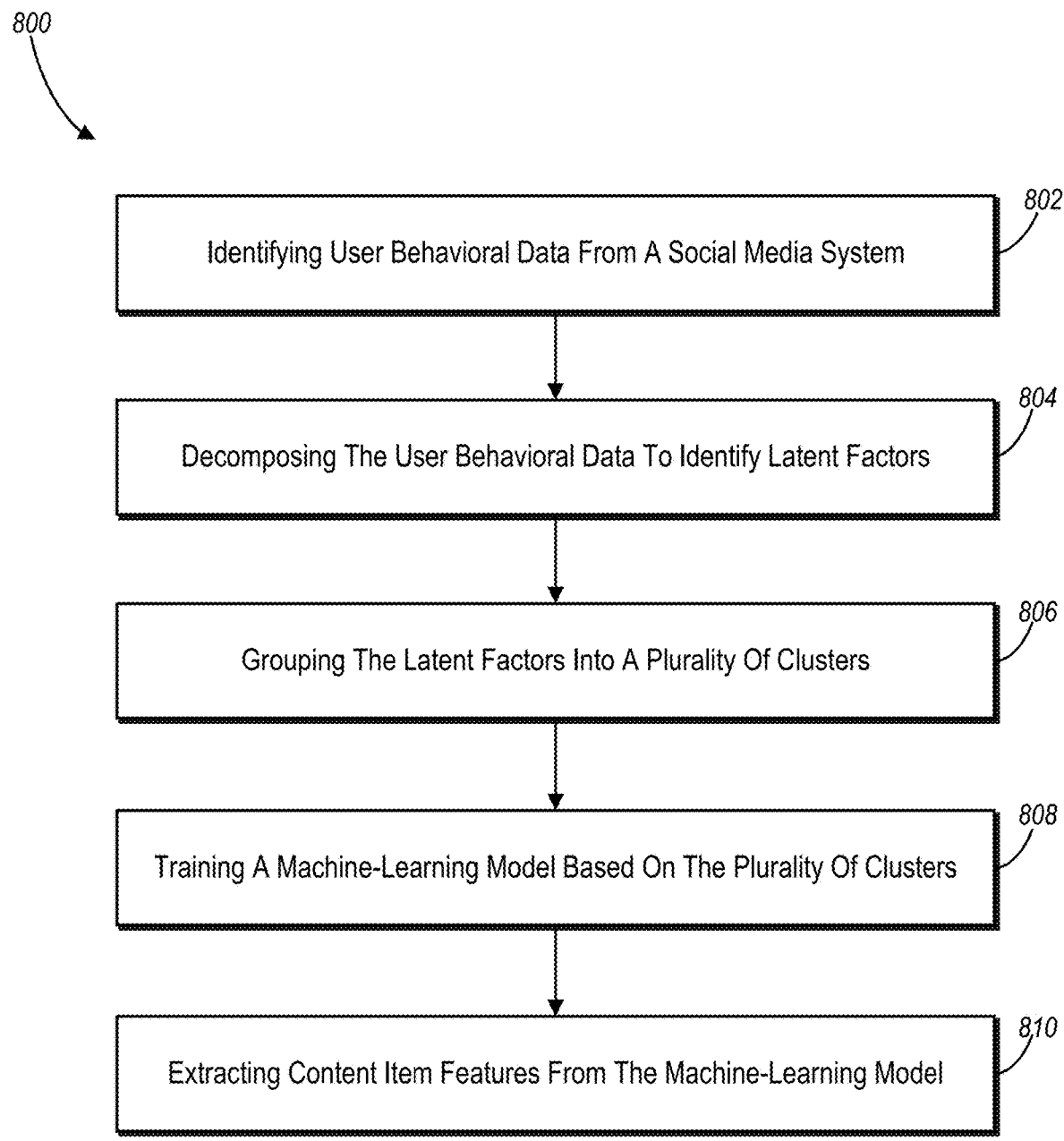
FIG. 8 illustrates another flowchart of a series of acts in a method of collaborative feature learning using unsupervised social media data in accordance with one or more embodiments.

FIGS. 1-6, the corresponding text, and the examples, provide a number of different systems and devices for performing collaborative feature learning using unsupervised social media data in accordance with one or more embodiments. In addition to the foregoing, one or more embodiments can also be described in terms of flowcharts comprising acts and steps in a method for accomplishing a particular result. For example, FIGS. 7 and 8 illustrate flowcharts of exemplary methods in accordance with one or more embodiments. The methods described in relation to FIGS. 7 and 8 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method 700 of collaborative feature learning using unsupervised social media data in accordance with one or more embodiments disclosed herein. The method 700 includes an act 702 of identifying user behavioral data in relation to content items. In particular, the act 702 may involve identifying user behavioral data from a social media system in relation to content items in the social media system. In some example embodiments, the user behavioral data may include implicit behavioral correlations between users and the content items, such as views, appreciations, or ownership.

The method 700 also includes an act 704 of determining latent representations from the content items. In particular, the act 704 may involve determining latent representations from the content items from the identified user behavioral data. For example, the act 704 may optionally involve deriving latent features of the content items from the identified user behavioral data.

The method 700 further includes an act 706 of learning features of the content items. In particular, the act 706 may involve learning features of the content items based on the latent representations from the content items. In one or more embodiments, the act 706 may optionally include training a neural network using the derived latent features of the content items to learn features of the content item.

The method 700 may further include the act of extracting content item features from the learned features of the content item using machine learning. In addition, the method 700 may include grouping the derived latent features of the content items into a plurality of clusters and learning features of the content items based on the plurality of clusters. In some example embodiments, the method 700 may include receiving a query content item, identifying one or more content items of the content items having similar content features to the content item received in the query, and providing the identified one or more content items in response to the query.

FIG. 8 illustrates a flowchart of a series of acts in a method 800 of collaborative feature learning using unsupervised social media data in accordance with one or more embodiments described herein. To illustrate, the method 800 includes an act 802 of identifying user behavioral data from a social media system. In particular, the act 802 may involve identifying user behavioral data from a social media system in relation to content items in the social media system. In one or more embodiments, the user behavioral data may include implicit behavioral correlations between users and the content items, such as when a particular user interacted with one or more of the content items. Further, the user behavioral data from the social media system in relation to the content items may include indications of when users of the social media system view a content item, appreciate a content item, or own a content item.

The method 800 also includes an act 804 of decomposing the user behavioral data to identify latent factors. In particular, the act 804 may involve decomposing the user behavioral data to identify latent factors of the content items. For example, the act 804 may optionally include factorizing a user behavior view matrix in to a latent content item matrix and a latent user matrix. Further, before decomposing the user behavioral data to identify latent factors, the method 800 may optionally include removing user behavioral data that is above a first threshold number of user interactions or that is below a second threshold number of user interactions.

The method 800 further includes an act 806 of grouping the latent factors into a plurality of clusters. In particular, the act 806 may involve grouping the latent factors of the content items into a plurality of clusters. The act 806 may optionally involve applying k-means clustering to the latent factors of the content items to group the latent factors into the plurality of clusters. Further, in some example embodiments, the method 800 may include creating pseudo classes for the content items using the plurality of clusters.

The method 800 also includes an act 808 of training a machine-learning model based on the plurality of clusters. For example, the act 808 may optionally include training a neural network based on pseudo classes of the content items. In some example embodiments, the act 808 may optionally include using supervisory training to train the neural network.

The method 800 additionally includes an act 810 of extracting content item features from the machine-learning model. In particular, the act 810 may involve extracting content item features from the neural network trained based on the plurality of clusters. In addition, the act 800 may optionally include composing a user-interaction matrix using the user behavioral data from the social media system in relation to the content items in the social media system, where the user-interaction matrix include entries that indicate interactions between each user of the social media system and each content item of the content items.

In one or more additional embodiments, the method 800 may include identifying one or more missing entries in the user-interaction matrix where the one or more missing entries indicate that a particular user did not interact with a particular content item of the content items, and proportionally populating, for each user, the one or more missing entries in the user-interaction matrix with positive and negative sample indications. The method 800 may optionally include performing regularization on non-missing entries of the user-interaction matrix and optimizing the non-missing entries of the user-interaction matrix using asynchronous stochastic gradient descent.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
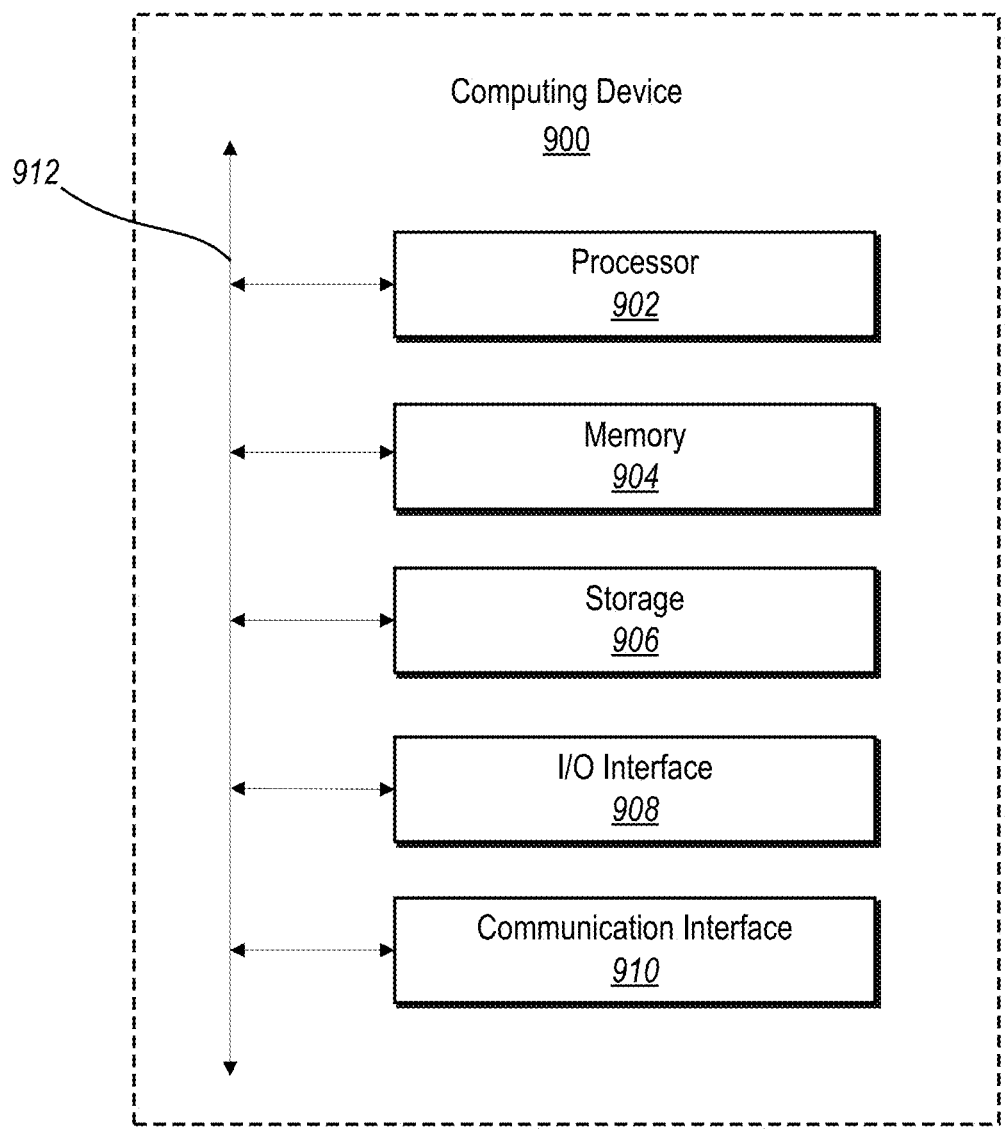
FIG. 9 illustrates a block diagram of an exemplary computing device in accordance with one or more embodiments.

FIG. 9 illustrates a block diagram of an exemplary computing device 900 that may be configured to perform one or more of the processes described above. One will appreciate that one or more computing devices, such as the computing device 900 may implement the machine learning system. As shown by FIG. 9, the computing device 900 can comprise a processor 902, memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG.

9. Components of the computing device 900 shown in FIG. 9 will now be described in additional detail.

In particular embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In particular embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, the storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In particular embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from the computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A method for collaborative feature learning using unsupervised social media data, the method comprising:
   identifying implicit user behavioral data from a social media system in relation to content items in the social media system;
   utilizing, by at least one processor, collaborative filtering to decompose the identified implicit user behavioral data without user-generated labels or otherwise supervised data into content item latent representations and user latent representations;
   training a neural network to learn content item features of the content items based on the content item latent representations obtained by the collaborative filtering; and
   applying the trained neural network by utilizing the learned content item features on a sample query content item.

2. The method of claim 1, wherein the neural network is trained in a supervised manner using the content item latent representations determined based on the implicit user behavioral data without user-generated labels or otherwise supervised data.

3. The method of claim 1, further comprising determining that a portion of the implicit user behavioral data indicates a negative correspondence between a first user and a first content item based on the first user interacting with the first content item for less than a threshold amount of time.

4. The method of claim 1, wherein the neural network is a deep convolutional neural network that is trained by applying a regression function directly from the content items based on the content item latent representations and without utilizing the user latent representations.

5. The method of claim 1, wherein the content item latent representations comprise a content item latent factors matrix and the user latent representations comprise an item latent factors matrix.

6. The method of claim 1, further comprising:
   grouping the content item latent representations into a plurality of clusters;
   creating discrete pseudo classes for each cluster of the plurality of clusters based on the content item latent representations;
   and training the neural network in a supervised manner using the pseudo classes as labels for the content items based on the plurality of clusters.

7. The method of claim 1, wherein the implicit user behavioral data from the social media system in relation to the content items in the social media system comprises views and non-views of content items by users.

8. The method of claim 1, further comprising:
   receiving a request to apply the trained neural network on an additional set of content items;
   determining content item features of one or more content items of the additional set of content items based on the trained neural network;
   identifying content item classifications for the one or more content items of the additional set of content items based using the determined content item features of the content items in the social media system; and
   providing, in response to the request, the content item classifications for the one or more content items of the additional set of content items.

9. The method of claim 8, further comprising:
   receiving an additional request to identify content items from the additional set of content items that is similar to a query content item;
   determining a query content item feature for the query content item using the trained neural network;
   identifying one or more content items from the additional set of content items that are similar to the query content item feature using the determined content item features of the additional set of content items; and
   providing, in response to the additional request, the one or more similar content items of the additional set of content items in response to the request.

10. The method of claim 1, further comprising:
    determining that the social media data is sparse when missing social media data satisfies a missing data threshold, wherein the missing data threshold is 99% social media data missing; and
    populating, in response to determining that the social media data is sparse, missing data until the social media data drops below the missing data threshold.

11. A system for collaborative feature learning using unsupervised social media data comprising:
    at least one processor;
    at least one non-transitory computer-readable storage medium storing instructions thereon that, when executed by the at least one processor, cause the system to:
      identify implicit user behavioral data from a social media system in relation to content items in the social media system;
      decompose the implicit user behavioral data to identify content item latent factors and user latent factors without user-generated labels or otherwise supervised data;
      group the content item latent factors into a plurality of clusters to generate content item pseudo classes;
      train a neural network in a supervised manner using the content item pseudo classes and the plurality of clusters; and
      extract content item features from the neural network trained based on the content item pseudo classes and the plurality of clusters.

12. The system of claim 11, wherein the implicit user behavioral data from the social media system is unlabeled data, and wherein the neural network is trained in the supervised manner using the content item pseudo classes as labels for the content items based on the plurality of clusters.

13. The system of claim 12, further comprising instructions that cause the system to remove user behavioral data that is above a first threshold number of implicit user interactions or that is below a second threshold number of implicit user interactions.

14. The system of claim 11, wherein the instructions cause the system to group the content item latent factors into the plurality of clusters by applying k-means clustering to the content item latent factors to group the latent factors into the plurality of clusters.

15. The system of claim 11, further comprising instructions thereon that, when executed by the at least one processor, cause the system to:
receive a query content item from a first user of the social media system;
apply the neural network trained based on the content item pseudo classes and the plurality of clusters to identify one or more users of the social media system that correspond to content item features of the query content item; and
provide the one or more identified users of the social media system to the first user.

16. The system of claim 11, further comprising instructions thereon that, when executed by the at least one processor, cause the system to compose a user-interaction matrix using the implicit user behavioral data from the social media system in relation to the content items in the social media system, wherein the user-interaction matrix comprises entries that indicate interactions between each user of the social media system and each content item of the content items.

17. The system of claim 16, further comprising instructions thereon that, when executed by the at least one processor, cause the system to:
identify missing implicit entries in the user-interaction matrix, the missing implicit entries indicating that a particular user did not interact with particular content items of the content items; and
proportionally populate, for each user, one or more missing implicit entries of the missing implicit entries in the user-interaction matrix with positive and negative sample indications.

18. The system of claim 17, further comprising instructions thereon that, when executed by the at least one processor, cause the system to:
perform regularization on non-missing implicit entries of the user-interaction matrix; and
optimize the non-missing implicit entries of the user-interaction matrix using asynchronous stochastic gradient descent.

19. The system of claim 17, wherein the instructions cause the system to proportionally populate the one or more missing implicit entries in the user-interaction matrix by populating the user-interaction matrix with more positive indications than negative indications.

20. A non-transitory computer-readable medium storing instructions thereon that, when executed by at least one processor, cause the computer to:
receive a notification of a user implicitly interacting with a first content item on a social media system;
provide the content item to a trained neural network to identify one or more additional content items that are similar to the content item, wherein the neural network is trained in a supervised manner using a plurality of content item latent factors organized by content item pseudo classes, and wherein the plurality of content item latent factors are based on a training dataset from implicit user behavioral data on a social media system determined without user-generated labels or otherwise supervised data; and
present the one or more additional content items to the user.

* * * * *